United States Patent [19]

Murata et al.

[11] Patent Number: 5,404,487
[45] Date of Patent: Apr. 4, 1995

[54] DISC ACCESS CONTROL METHOD FOR CACHE-EMBEDDED DISC CONTROL APPARATUS WITH FUNCTION-DEGRADATION CAPABILITY OF DATA TRANSMISSION PATH

[75] Inventors: Tomohiro Murata; Masaharu Akatsu, both of Yokohama; Kenzo Kurihara, Tokyo; Yoshiaki Kuwahara; Shigeo Honma, both of Odawara, all of Japan

[73] Assignee: Hitachi, Ltd., Tokyo, Japan

[21] Appl. No.: 89,633

[22] Filed: Jul. 12, 1993

Related U.S. Application Data

[63] Continuation of Ser. No. 412,441, Sep. 26, 1989, abandoned.

[30] Foreign Application Priority Data

Sep. 28, 1988 [JP] Japan .................. 63-240977

[51] Int. Cl.[6] ........................... G06F 13/14
[52] U.S. Cl. .............. 395/425; 364/DIG. 1; 395/275; 371/11.1; 371/40.1
[58] Field of Search .............. 364/200 MS File; 371/11.1 MS File, 40.1 MS File; 395/275, 925, 500 MS File, 700 MS File

[56] References Cited

U.S. PATENT DOCUMENTS

| | | |
|---|---|---|
| 4,215,400 | 7/1980 | Denko .................. 364/200 |
| 4,437,155 | 3/1984 | Sawyer et al. ........ 364/200 |
| 4,476,526 | 10/1984 | Dodd ................... 364/200 |
| 4,636,946 | 1/1987 | Hartung et al. ...... 364/200 |
| 4,686,621 | 10/1987 | Keeley et al. ........ 364/200 |
| 4,800,483 | 1/1989 | Yamamoto et al. .... 364/200 |
| 4,858,117 | 8/1989 | DiChiara et al. ..... 364/200 |
| 4,958,351 | 9/1990 | Flora et al. .......... 371/40.1 |
| 4,984,149 | 1/1991 | Iwashita et al. ...... 364/200 |
| 5,025,366 | 6/1991 | Baror ................... 364/200 |
| 5,070,502 | 12/1991 | Supnik et al. ........ 371/11.1 |
| 5,142,627 | 8/1992 | Elliot et al. .......... 395/275 |

OTHER PUBLICATIONS

IBM Technical Disclosure Bulletin, vol. 30, No. 12, May 1988 pp. 135–136.

Primary Examiner—Joseph L. Dixon
Assistant Examiner—B. James Peikari
Attorney, Agent, or Firm—Antonelli, Terry, Stout & Kraus

[57] ABSTRACT

A disc controller, which is connected to a plurality of channels for supplying access requests and discs. The controller includes a plurality of storage paths which control transfer of data between a cache, the channels and the discs, and a control memory which controls the respective operations of the plurality of storage paths. The control memory stores information which is used to select a storage path in accordance with predetermined standards for storage path selection. A disc or the cache is accessed using the selected storage path.

21 Claims, 16 Drawing Sheets

FIG. 11

| MP2 STATUS \ MP1 STATUS | NORMAL (1111) | PATH x TO NVS (0111) | PATH x TO CACHE (1011) | PATH x TO MP2 (1110) |
|---|---|---|---|---|
| NORMAL (1111) | SET TO '11' SP STATUS OF SP INCLUDING THE MP1/MP2 | SET TO '10' SP STATUS OF SP INCLUDING THE MP1/MP2 | SET TO '00' SP STATUS OF SP INCLUDING THE MP1/MP2 | ← |
| PATH x TO NVS (0111) | | | | |
| PATH x TO CACHE (1011) | | | | |
| PATH x TO MP1 (1101) | ↓ (SET 0 IN FLAG CORR TO SP, INCLUDING APPROPRIATE MP1/MP2, IN SP-OPERATABLE TABLE (200)) | | | |

FIG. 16

| ACCESS PROCESSES / DATA TRANSFER PATHS | USING CACHE/NVS | | | | USING CACHE | | | | USING NO CACHE |
|---|---|---|---|---|---|---|---|---|---|
| | HIT | | MISS | | HIT | | MISS | | |
| | READ | WRITE | READ | WRITE | READ | WRITE | READ | WRITE | |
| CH–DISC | | | | | | | | ○ | ○ |
| CH–CACHE | ○ | | ○ | ○ | ○ | ○ | ○ | | |
| CH–NVS | | ○ | | ○ | | | | | |
| DISC–CACHE | | | ○ | ○ | | | ○ | | |

FIG. 18

| SP-LEVEL \ SP-STATUS | (P1) | (P2) | (P3) | (P4) |
|---|---|---|---|---|
| (LEVEL 5) | ○ | ○ | ○ |   |
| (LEVEL 4) | ○ | ○ |   | ○ |
| (LEVEL 3) | ○ | ○ |   |   |
| (LEVEL 2) | ○ |   |   | ○ |
| (LEVEL 1) | ○ |   |   |   |

DISC ACCESS CONTROL METHOD FOR CACHE-EMBEDDED DISC CONTROL APPARATUS WITH FUNCTION-DEGRADATION CAPABILITY OF DATA TRANSMISSION PATH

This application is a continuation of application Ser. No. 07/412,441, filed on Sep. 26, 1989, abandoned.

BACKGROUND OF THE INVENTION

The present invention relates to a disc access control method and apparatus, and more particularly to a method and an apparatus, including a cache memory, which are suitable for control of the degeneration of a disc access function due to errors and for recovery of the disc access function.

In a conventional disc control apparatus, having a cache, frequently accessed data is stored in the cache and is read from the cache, without access to a disc, to improve the efficiency of accessing data. As described in Japanese Patent Publication JP-A-60-79447, if a problem in the cache is detected for any one of the storage paths, the whole cache is disconnected and all reading/writing of data in the cache via other storage paths is discontinued. By disconnecting the whole cache, the storage path, which can no longer correctly read/write in the cache, directly updates records on the disc, while other access paths, which can correctly read/write in the cache, are prevented from reading old data from the records in the cache, thereby preventing transfer of old data, which is different from the latest data stored on the disc (hereinafter referred to as a data change condition).

In the conventional disc control apparatus, if any one of the storage paths detects a problem within the cache, the error is regarded as an error in the whole cache, and the cache is disconnected from the disc control apparatus. However, an error on the side of the storage path may appear as a cache error, in which case the cache is disconnected, although there may be many remaining storage paths which can be used to read/write in the cache correctly. Therefore, the usability of the cache is greatly reduced.

A method is conceivable in which a storage path in which a cache error has been detected is closed and the use of the cache by another storage path which can be used to correctly read/write in the cache is continued to be used, thereby increasing the usability of the cache and preventing a data change condition from occurring. However, according to this method, the direct access to a disc by a storage path, in which a cache error has been detected, is also discontinued. Therefore, if there is a disc connected to only the access path in which the cache error has been detected, it will not be possible to access that disc at all.

On the other hand, if a disc is accessed directly, a different data transfer path is used, depending on whether data to be accessed is present in the cache, so that even those storage paths, which have experienced an error in accessing the cache, can access the disc. Therefore, there is the problem that the storage paths are not utilized effectively.

SUMMARY OF THE INVENTION

It is an object of the present invention to increase the usability of a disc control apparatus and to prevent the occurrence of a data change condition.

It is another object of the present invention to facilitate the maintenance which is performed during the operation of a disc control apparatus.

A disc control apparatus according to the present invention, includes a plurality of channels, discs for storing data, a plurality of storage paths provide which for parallel processing of data being transferred between the channels and the discs, a cache for storing a copy of part of the data stored on the disc, and a control memory for controlling access to the plurality of storage paths. The disc control apparatus stored a reference for selecting an executable storage path in the control memory in order to achieve the above objects.

A method of controlling the disc control apparatus according to the present invention will now be described more specifically. A functional level indicative of a type of cache use by a storage path which connects a channel and a disc is provided as a reference in that storage path. Also, an access level which defines a functional level which a storage path capable of accessing a disc should have, at the least, is provided in that disc, which is controlled by the disc control apparatus. Only a storage path having a functional level higher than the access level of a disc to be accessed will be permitted to access that disc. A criterion for selecting a storage path used when an initial start-up command is received from a channel, and a criterion for selecting a storage path used for connection to a disc, when a report on the completion of the SEEKing operation (involving the positioning of a magnetic head) from the disc is received, are changed to select an available storage path having the necessary functional level each time an initial start-up command and report is received.

As mentioned above, the disc to be accessed is accessed in conformity with a functional level designated as an access level in the disc, using only a storage path having a functional level higher than the one designated as the access level in the disc. This prevents the plurality of storage paths from accessing the disc at different functional levels, to thereby prevent a data change condition which would otherwise occur. By setting the access level set in the disc at the highest possible level, in a range of conditions where storage paths which can access the disc can exist, an optimal type of cache use, when a storage path accesses the disc, is selected optimally in that disc, and the problem of reduction in the usability of the cache is solved.

When an error occurs, the functions of the storage paths vary from storage path to storage path. In such a case, a criterion for selecting a storage path to be used when an initial start-up command is received from a channel, and a criterion for selecting a storage path to be used when a report on the completion of the SEEKing operation is received from the disc, are changed to enable the use of a storage path which can be used in only one of the two cases, where the initial start-up command is received and when the report is received, in the other of the two cases to thereby increase the number of storage paths available. The presence of one storage path, which can receive an initial start-up from a channel, and another storage path, which can receive a report on the completion of the SEEKing operation from a disc, serves to determine that there is one normal storage path to thereby increase the usability of the storage paths. Thus, the degree of cache use can be selected optimally for each disc to prevent reduction in the usability of the cache.

BRIEF DESCRIPTION OF THE DRAWINGS

FIG. 11 illustrates a decision table which gives the relationship between the status of a logical storage path and the status of two modules constituting the storage path.

FIG. 16 is a list of routes used for transfer of data.

FIG. 18 illustrates the relationship between SP-LEVEL and SP-STATUS used for changing the functional level of the storage path.

DESCRIPTION OF THE PREFERRED EMBODIMENTS

An embodiment directed to setting a functional level of a storage path as a reference level will now be described.

Figure 1:
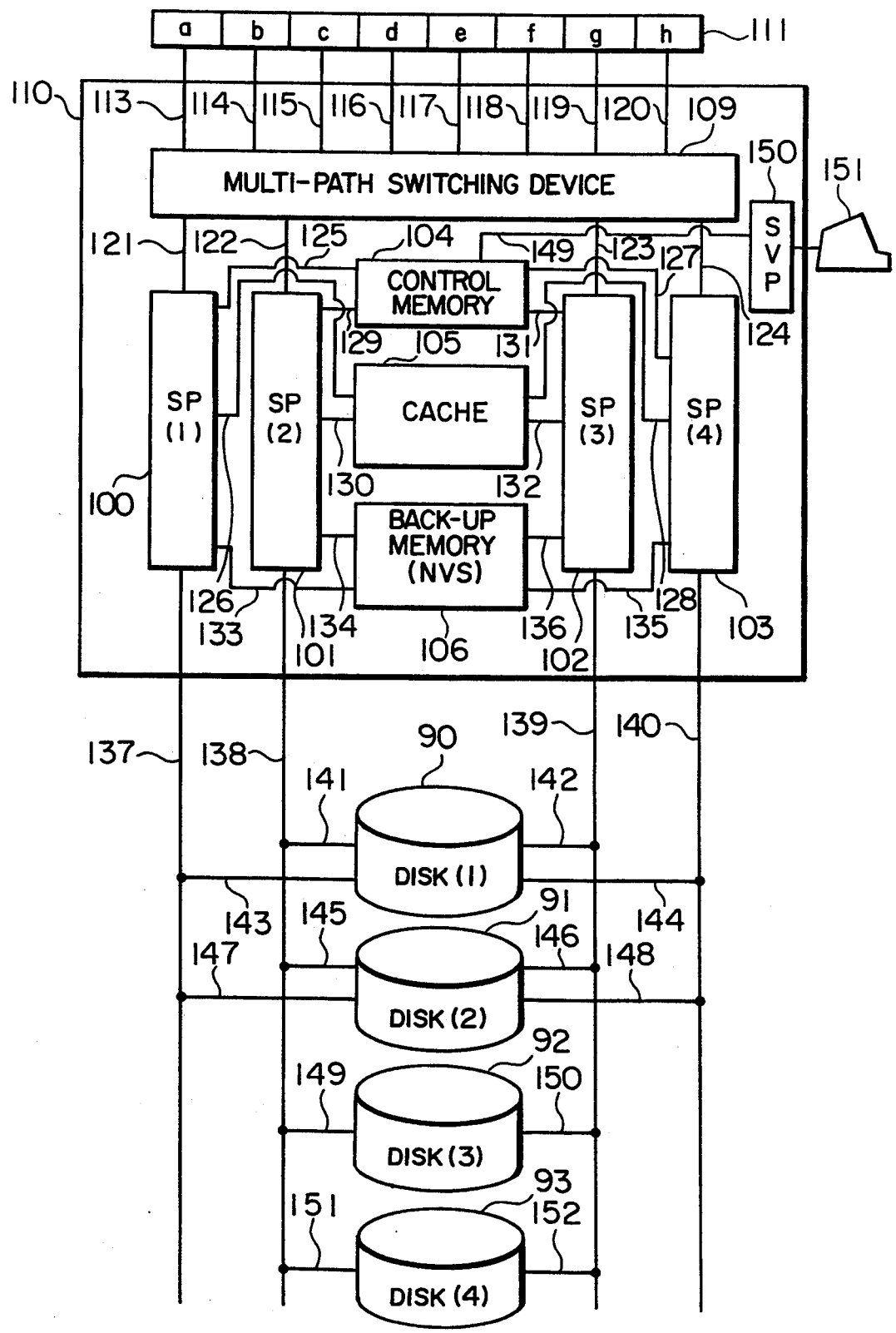
FIG. 1 is a block diagram of a disc subsystem and a disc control apparatus representing an embodiment of the present invention.

FIG. 1 is a block diagram of a disc subsystem, to which the present invention is applied. The disc subsystem includes a channel control unit 111, a disc control apparatus 110, discs 90-93, connection lines 113-120 which connect the channel control unit 111 and the disc control apparatus 110, and connection lines 137-152 which connect the disc control apparatus and the discs 90-93. The discs 90-93 may be magnetic discs, optical discs or semiconductor discs.

The channel control unit 111 includes eight channels a-h through which requests for access to the discs 90-93 can be made simultaneously. The disc control apparatus 110 includes data transfer control units 100-103 (referred to hereinafter as storage paths (SP)), which receive requests for access to data from the channels and transfer (read/write) data between the channels and the discs in a parallel manner. Specifically, each storage path is realized by a special-purpose processor or a general-purpose microprocessor. The connections between the eight channels a-h and the four storage paths 100-103 are controlled in a dynamic switching manner by a Multi-Path switching Device 100, such that requests for access from the channels via the connection lines 121-124 are not collectively received by any particular storage path SP. The disc control apparatus 110 further includes a cache 105, which is connected to storage paths (1)-(4) via connection lines 126, 128, 130 and 132, respectively, and a back-up memory (NVS) 106, which is connected to storage paths (1)-(4) via connection lines 133-136, respectively. The disk control apparatus 110 includes the connection lines 137-140 which connect the storage paths 100-103 to the disks 90-93. As described in the foregoing, each storage path includes data transfer paths respectively connecting the storage path itself to the channels, cache, backup memory and disks. Accordingly, the storage path can be considered to be an aggregation of three kinds of data transfer paths including a data transfer path for performing read/write between the channels and the cache, a data transfer path for performing read/write between the channels and the backup memory, and a data transfer path for performing read/write between the channels and the disks. In other words, the storage path has a function to arbitrarily select one of these data transfer paths included in the storage path itself, and to perform desired data transfer. The cache 105 is a volatile memory which stores a copy of a part of the data stored in discs 90-93.

When a storage path SP receives from a channel a request for access (read) to data previously stored in the cache 105 (such a request for access is referred to hereinafter as a cache hitting access request), it reads the data in the cache 105, instead of reading the data from the discs 90-93, to increase the responsiveness of access to the data. If the cache hitting access request is a write request, the storage path SP updates the data previously stored in the cache 105 and simultaneously writes the same updating data into the back-up memory (NVS) 106, which is a volatile memory for backing up the updating data in the cache, to terminate the processing for the write request from the channel only by updating the data in the cache, without updating the data stored on the discs 90-93. Later, the storage path SP writes the new data updated only in the cache onto the disc, during an available time after data transmission between the disc control apparatus 110 and the channel, using the data stored in the back-up memory 106, to thereby increase the responsiveness of access to the write request (referred to as a disc high-speed write).

A control memory 104, which is connected to storage paths (1)-(4) via connection lines 125, 129, 131 and 127, respectively, is a memory to be referred to when the four storage paths (1)-(4) in the disc control apparatus 110 process an access request. This control memory 104 stores data as shown in FIG. 2 in the form of a table.

Figure 2:
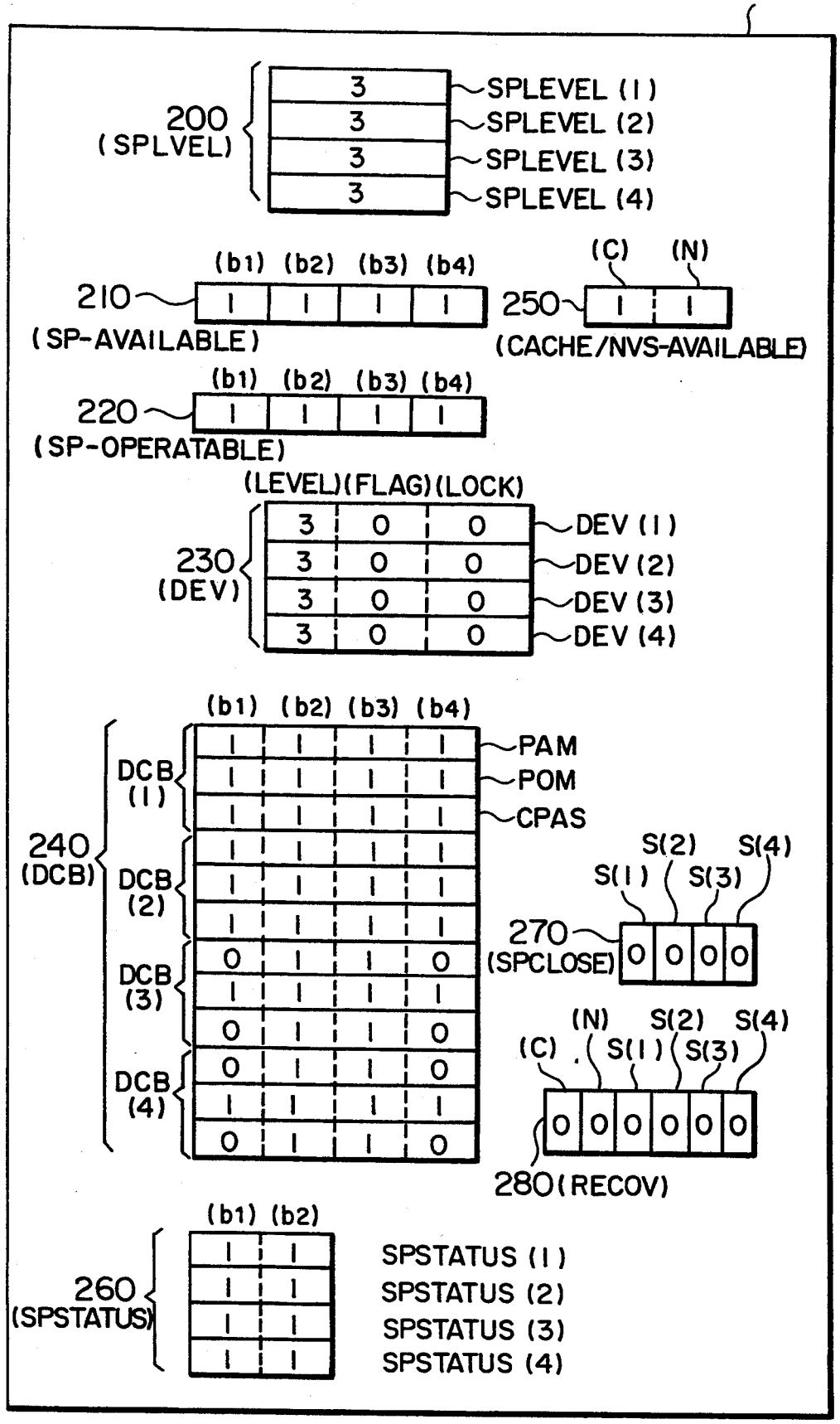
FIG. 2 illustrates the contents of a common control memory are used in the disc control apparatus.

Referring to FIG. 2, a SP-LEVEL table 200 stores one of the following three functional levels, which are set according to current cache status, as a functional level indicative of the type of cache use available to the respective storage paths depending on the respective degrees of error experienced in the storage paths (1)–(4):

(1) Functional level 3 at which a channel can directly read a disc and write data onto the disc via a storage path, and can read the cache and write data into the cache via the storage path between the channel and the cache;

(2) Functional level 2 at which a channel can directly read a disc and write data onto the disc via a storage path, and can only read the cache via the storage path between the channel and the cache; and (3) Functional level 1 at which a channel can directly read a disc and write data onto the disc via a storage path, and can neither read the cache, nor write data into the cache, via the storage path between the channel and the cache.

In the example illustrated in FIG. 2, the level 3 is set as the initial functional level of all the storage paths in the SP-LEVEL table 200. A flag indicative of whether each of the four storage paths (1)–(4) in the disc control apparatus 110 is logically available or not ("1" indicates that a storage path SP is available, and "0" indicates that a storage path SP is not available) is also set in a SP-AVAILABLE table 210. In the example illustrated in FIG. 2, the flags for all the storage paths are set in table 210 so as to indicate that all storage paths are logically available. A flag indicative of whether each of the storage paths (1)–(4) is functionally available ("1" indicates that a storage path SP is available and "0" indicates that a storage path SP is not available) is set in a SP-OPERABLE table 220. In FIG. 2, the flags for all of the storage paths are shown as being set to indicate that all storage paths are functionally available. The functional levels of the storage paths as set in the SP LEVEL table 200 make sense only when the storage paths are functionally available.

A path functional level (access level) that a storage path must have to access a disc, as a minimum, is set as a variable in a (LEVEL) column for each of the DEV rows (1)–(4) of a DEV table 230, each row of which correspond to a respective disc. The following four access levels are provided:

(a) Access level 3 which allows the disc to be accessible from only a storage path at the functional level 3;

(b) Access level 2 which allows the disc to be accessible from only a storage path at the functional level 2 or 3;

(c) Access level 1 which allows the disc to be accessible from a storage path at the functional level 1, 2 or 3; and (d) Access level 0 which inhibits any access to the disc.

In the example of FIG. 2, the variables in the column (LEVEL) for rows DEV (1)–(4) indicative of access levels of the discs 90–93 are all set to level 3. The contents of columns (FLAG) and (LOCK) in DEV table 230 will be described later.

The structure of an access path between a disc and a channel controlled by the disc control apparatus 110 is set in a DCB table 240 in correspondence to that disc. More specifically, the structure of an access path present between a disc and a channel is set as three data values PAM, POM and CPAS for each of the discs 90–93 in DCBs (1)–(4). A flag indicative of which of the storage paths (1)–(4) in the disc control apparatus each disc is logically connected to ("1" indicates the presence of connection and "0" indicates the absence of connection) is set in columns (b1)–(b4) of the row PAM. In the example of FIG. 2, since discs 90 and 91 are connected to all storage paths (1)–(4) via paths 137–140, the columns (b1)–(b4) of the row PAM of DCBs (1) and (2) are all set to "1". Since discs 92 and 93 are connected to only storage paths (2) and (3) via paths 138 and 139, values of PAM for the (b1) and (b4) columns of DCBs (3) and (4) are set to "1" and the remaining ones are set to "0". A flag indicative of which of the storage paths (1)–(4) in the disc control apparatus can functionally access any particular disc ("1" indicates that a storage path SP can access the disc and "0" indicates that a storage path SP cannot access the disc) is set in each of (b1)–(b4) columns of the row POM. In FIG. 2, the POM values in the columns (b1)–(b4) for the DCBs (1)–(4) are all set to "1". The results of ANDing the corresponding bits for PAM and POM in the respective (b1)–(b4) columns of the DCB table 240 are set in the row CPAS of the DCBs (1)–(4). Specifically, CPAS values of the respective columns (b1)–(b4) show, in correspondence to a disc, a flag indicative of one of the storage paths (1)–(4) in the disc control apparatus to which the respective discs are logically connected and which storage path is capable of actually accessing that disc at present ("1" indicates that a storage path SP can access that disc and "0" indicates a storage path SP which cannot access that disc).

The statuses of the storage paths (1)–(4) in the disc control apparatus with respect to errors are set as storage path SP STATUSes (1)–(4) in a SP STATUS table 260 in correspondence to the respective storage paths. Value "1" is set in the (b1) column for the SP status when the storage path SP can access the cache 105 and "0" is set when the storage path SP cannot. Value "1" is set in the (b2) column when the storage path SP can access the back-up memory (NVS) 106 and "0" is set when the storage path SP cannot.

Flags (C) and (N) indicative of whether the cache 105 and the back-up memory (NVS) 106, respectively, are available or not are set in a cache/NVS-AVAILABLE table 250 in which "1" indicates those that are available and "0" indicates those that are not. In the example of FIG. 2, "1" is set as an initial value both for flags (C) and (N).

A request for closing any storage path SP is set in a SP CLOSE table 270. If "1" is set in the S(n) position of this table, it is determined that closing of SP(n) is requested.

Requests for recovery of the cache 105, the back-up memory (NVS) 106 and any of the storage paths are set in a RECOV table 280. If "1" is set in the (C), (N) or any (S) location, it is determined that a request for recovery of the cache 105, the back-up memory (NVS) 106 and the respective storage path has been made. The SP CLOSE table 270 and the RECOV table 280 are set by a serviceman through a service processor 150 from a maintenance terminal 151 of FIG. 1.

How a disc access control system according to the present invention is realized will now be described with reference to the control data in the control memory 104, as mentioned above, with reference to the flowchart of FIG. 3, which illustrates the operation of the respective storage paths in accordance with the present invention. These operations are specifically implemented by a microprogram operating in the respective storage paths. First, each storage path SP determines whether an access command from a channel has arrived at that storage path via the switching device 109 (block 299). If it is determined that no access command has arrived, it is determined whether a closing request flag is set in SPCLOSE table 270 for the particular storage path (block 323). If the flag is set, the storage path is closed (block 324). Furthermore, it is determined whether a recovery request flag is set in RECOV table 280 for the storage path (325). If this flag is set, the recovery of a component in the storage path is performed (block 326), and control returns to the block 299, where it is again determined whether an access command has arrived from a channel. The details of the storage path closing and component recovery operations will be described later.

If it is determined in block 299 that an access command has arrived, control passes to execution of the access command, as follows. First, the number (No.) of a disc to be accessed is received from the channel (block 300). The value of a variable in the (LOCK) column in a DEV (n) row corresponding to the disc (No.=n) in the DEV table 230 is checked (block 301). If the value of the variable is 1, it is determined that disc locking cannot be obtained (since the disc is already locked), the receipt of the access command is cancelled, a BUSY RETRY is returned to the channel, and control returns to the block 299, where it is determined whether another access command has arrived.

If it is found in block 301 that the value of the variable in the (LOCK) column of table 230 is 0, it is determined that disc locking is obtainable, the value of the variable is set to 1, and a process (1) for reviewing the access level of the disc (No.=n) is performed (block 298). Furthermore, the value of a variable in the (FLAG) column for the DEV (n) corresponding to the disc (No.=n) in DEV table 230 ils checked (block 303). If the value of the variable is 0, it is immediately determined whether access to the disc is executable (block 305). If the value of the variable in the (FLAG) column is 1, a process (2) for reviewing the access level of the disc (No.=n) to be accessed is performed (block 315), and it is then determined whether access is executable or not (block 305). The details of the processes (1) and (2) for reviewing the access level and the determination as to whether access is executable will be described later.

If it is determined in block 305 that access is not executable, the execution of the command is discontinued, and ERROR RETRY is returned to the channel (block 317). The value of the variable in the (FLAG) column for the DEV (n) corresponding to the disc (No.=n) in table DEV 230 is set to 0 (block 312), and control returns to the block 299, where it is determined whether another access command has arrived from a channel.

If it is determined that access is executable at block 305, a record address to be accessed is received (block 304), and data in the cache is retrieved (block 307). If the record to be accessed is stored in the cache, it is read or written as a hit operation. If at this time a record is to be read, the contents of the record in the cache are transferred to the channel; while, if a record is to be written, the contents of the record in the cache are updated and the updated contents of the record are simultaneously stored in the back-up memory (NVS) 106 (block 309). If the record to be accessed is not stored in the cache, the record on the disc (No.=n) is directly read or written as a miss operation, and the contents of the record to be accessed are transferred from the disc to the cache.

It is then determined whether these processes are normally terminated (block 311). If so, the value of the variable in the (FLAG) column for the DEV (n) corresponding to the disc (No.=n) in table 230 is set to 0 (block 312) and control returns to block 299, where it is determined whether another access command has arrived from a channel.

If an error occurs in the appropriate storage path during execution of a command, and the process has terminated, control enters an error processing sequence, including setting a factor of error (block 319), changing the functional level of the storage path (block 321), and closing the cache/NVS (block 322). The details of these processes will be described later.

The operations for determination of the executability of the access (block 305), the processes (1) and (2) for reviewing the access level of the disc to be accessed (blocks 298 and 315), the processing for setting the factor of error in the storage path (block 319), the changing of the functional level of the storage path (block 321), the closing of the cache/NVS (block 322), the closing of the storage path (block 324), and the recovering of a component in the storage path (block 326) will be described below.

Figure 4:
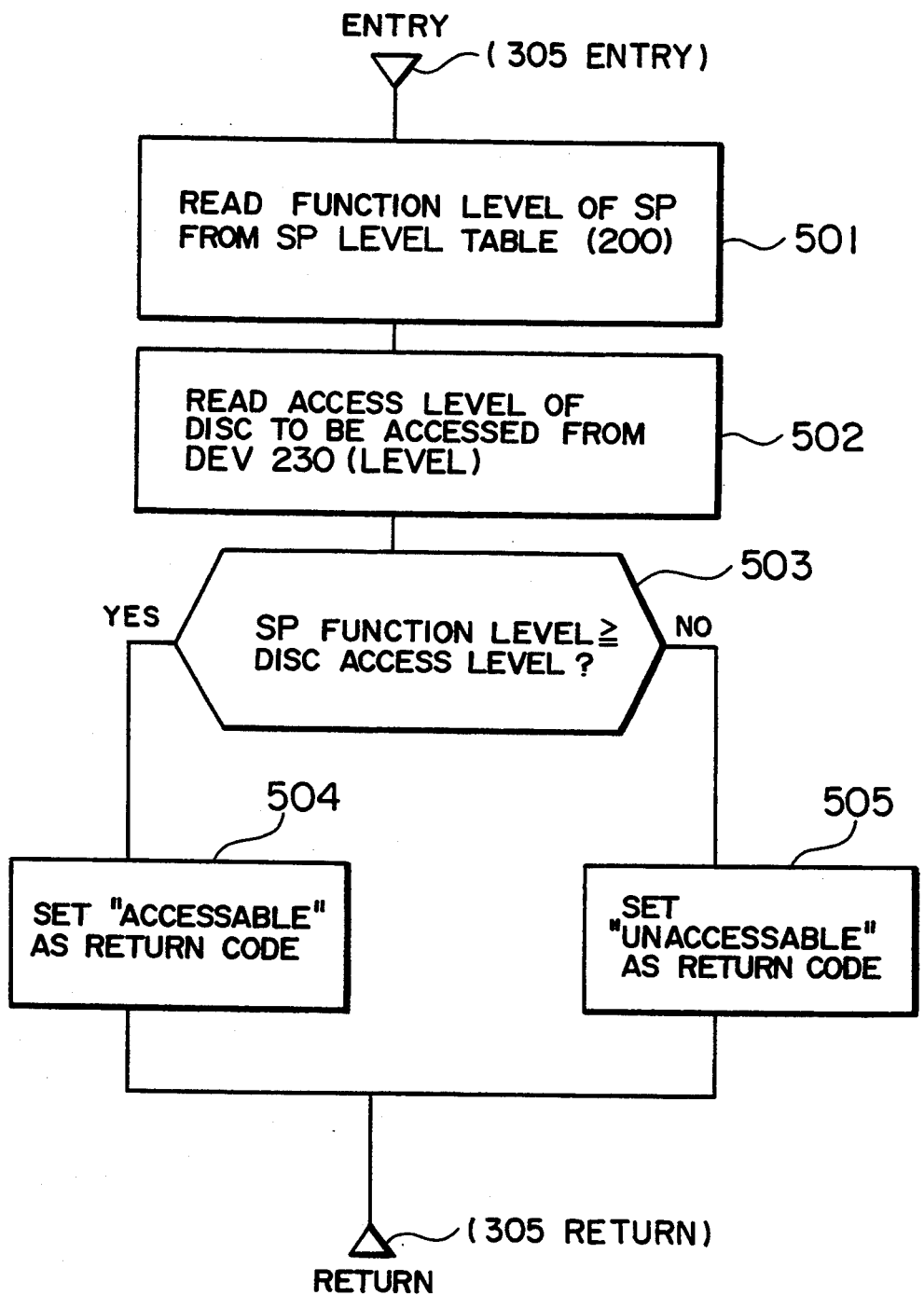
FIG. 4 is a flowchart explaining the details of a procedure for determining the permission/rejection of access in the operation of each storage path in FIG. 1.

The determination as to whether the access may be executed (block 305) will be described with reference to the flowchart of FIG. 4. First, the current functional level of the storage path is read from the SPLEVEL table 200 of FIG. 2 (block 501), the current access level of the disc to be accessed (No.=n) is then read from the (LEVEL) column of DEV table 230 (block 502), and the read value of the functional level of the storage path and the value of the access level of the disc to be accessed are compared. If the read value of the functional level of the storage path is larger than that of the access level of the disc to be accessed, it is determined that the disc to be accessed can be accessed by the storage path. Otherwise, it is determined that it can not.

Figure 5:
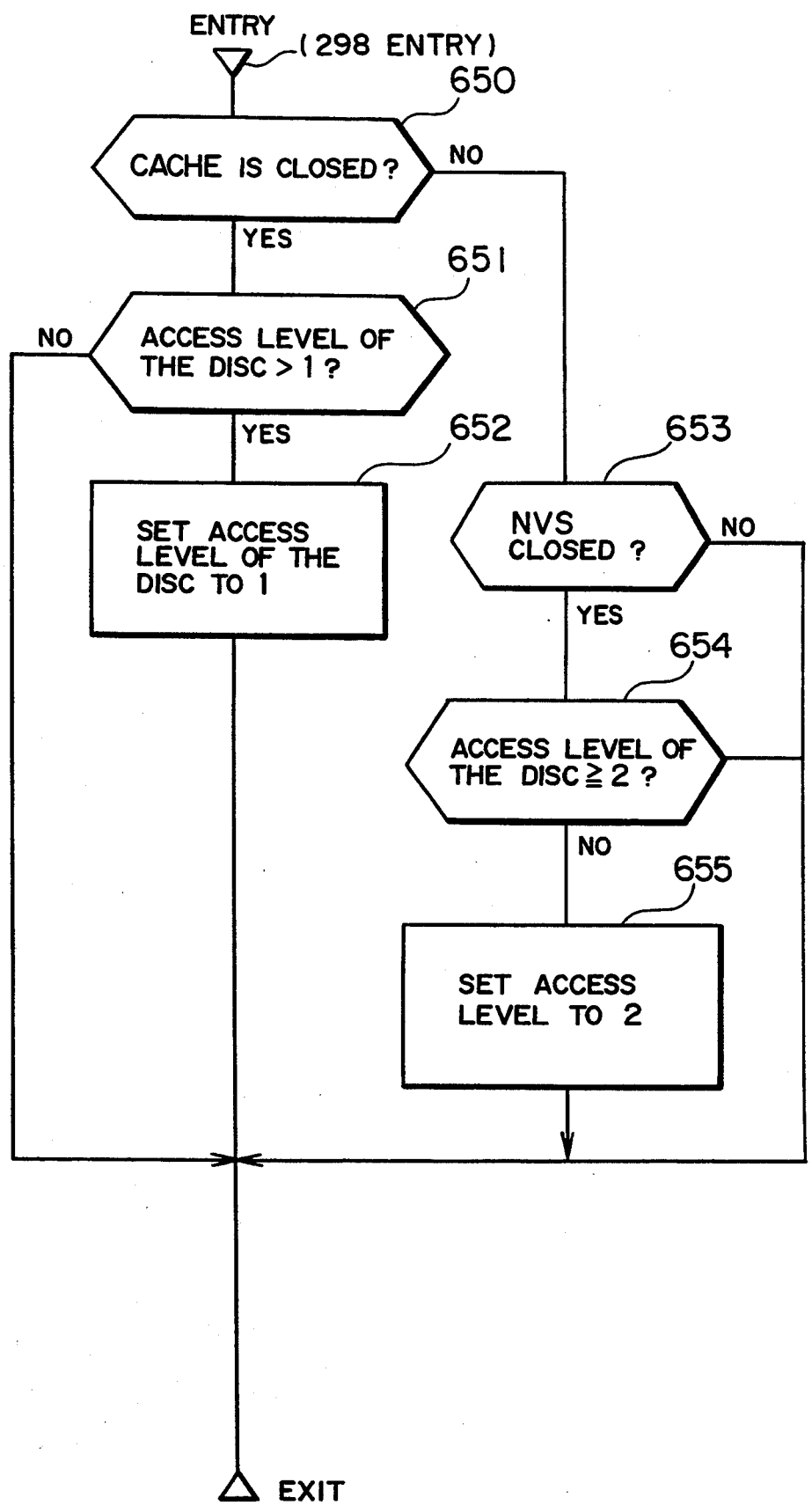
FIG. 5 is a flowchart explaining the details of a procedure (1) for changing the access level in a disc in the operation of a storage path.

The process (1) for reviewing the access level of the disc to be accessed (block 298 in FIG. 3) will be described with reference to the flowchart of FIG. 5. First, it is determined whether the cache is closed in accordance with the (C) flag of the cache/NVS-AVAILABLE table 250 (block 650 in FIG. 5). If so, the access level of the disc to be accessed is set to 1 only when it is equal to, or higher than, 1 (blocks 651, 652). Otherwise, it is determined whether the back-up memory (NVS) 106 is closed in accordance with the (N) flag in table 250 (block 653). If the back-up memory (NVS) 106 is closed, the access level of the disc to be accessed is set to 2 only when it is equal to, or higher than, 2 (blocks 654, 655).

Figure 6:
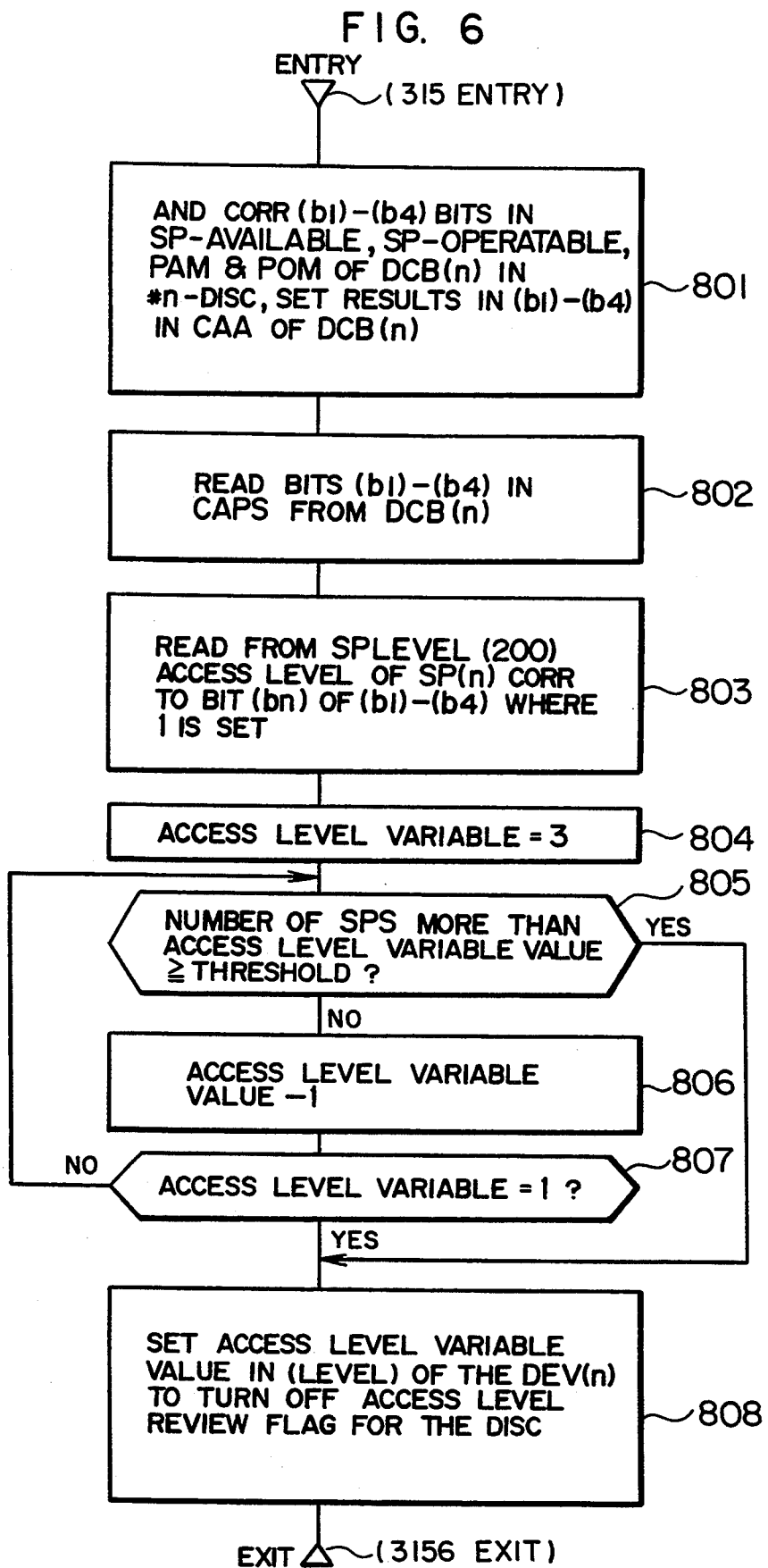
FIG. 6 is a flowchart explaining the details of a procedure (2) for changing the access level of a disc in the operation of a storage path.

Now, the process (2) for reviewing the access level of the disc to be accessed (block 315 in FIG. 3) will be described with reference to the flowchart of FIG. 6. First, the four respective sets of flags in columns (b1)–(b4) of the SP-AVAILABLE table 210, the SP-OPERATABLE table 220 and the PAM and POM rows for a DCB (n) corresponding to the disc (No.=n) to be accessed in table 230 are ANDed, and the resulting values are set in DEV table 230 as the corresponding flags in columns (b1) –(b4) of the CPAS row of the DCB (n) corresponding to the disc to be accessed (block 801 in FIG. 6). Subsequently, the flags in columns (b1)–(b4) of the CPAS row for the DCB (n) are read from the DCB table 240 (block 801), and the functional level SPLEVEL (n) of the storage path SP (n) corresponding to the flag (bn) in which "1" is set in the read-out CPAS row is read from the SPLEVEL table 200 (blocks 802, 803). Since a plurality of such SPLEVELs (n) generally are obtained, the SPLEVEL (n) having the highest functional level value, among SPLEVELs satisfying the condition in which there are plural storage paths each having a different SPLEVEL higher than a certain functional level and larger in number than a threshold value, in accordance with the combination of the values of SPLEVELs, is employed as the access level of the disc and is set in the access level variable in DEV table 230 (blocks 804, 805, 806, 807). The value of the access level variable obtained finally is set in the (LEVEL) column of the DEV (n) of the disc and the value of the (FLAG) column is set to 0.

Figure 7:
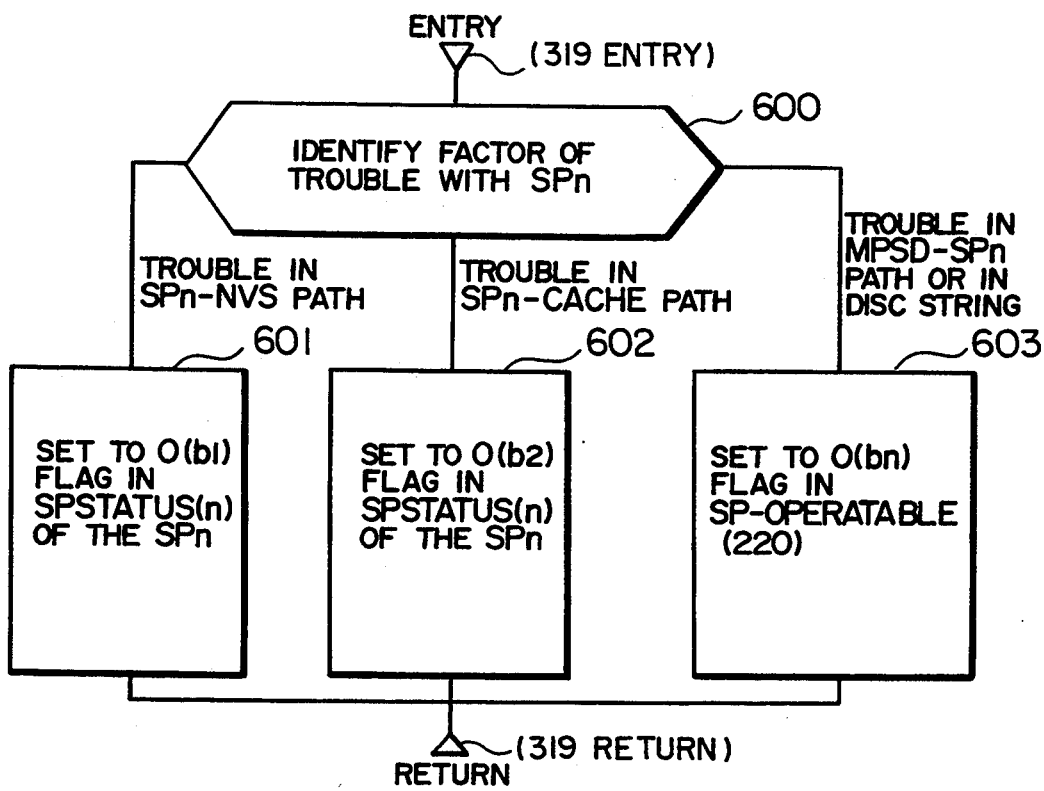
FIG. 7 is a flowchart explaining the details of a procedure for setting a factor of storage path error in the operation of a storage path.

In the flowchart of the storage path trouble factor setting procedure (FIG. 7), the factor of error in the storage path is identified (block 600 in FIG. 7), and the result is set in the form of a bit pattern in the flags of columns (b1) and (b2) for the SPSTATUS (n) corresponding to the SP (n) in the SPSTATUS table 260 of FIG. 2.

Figure 8:
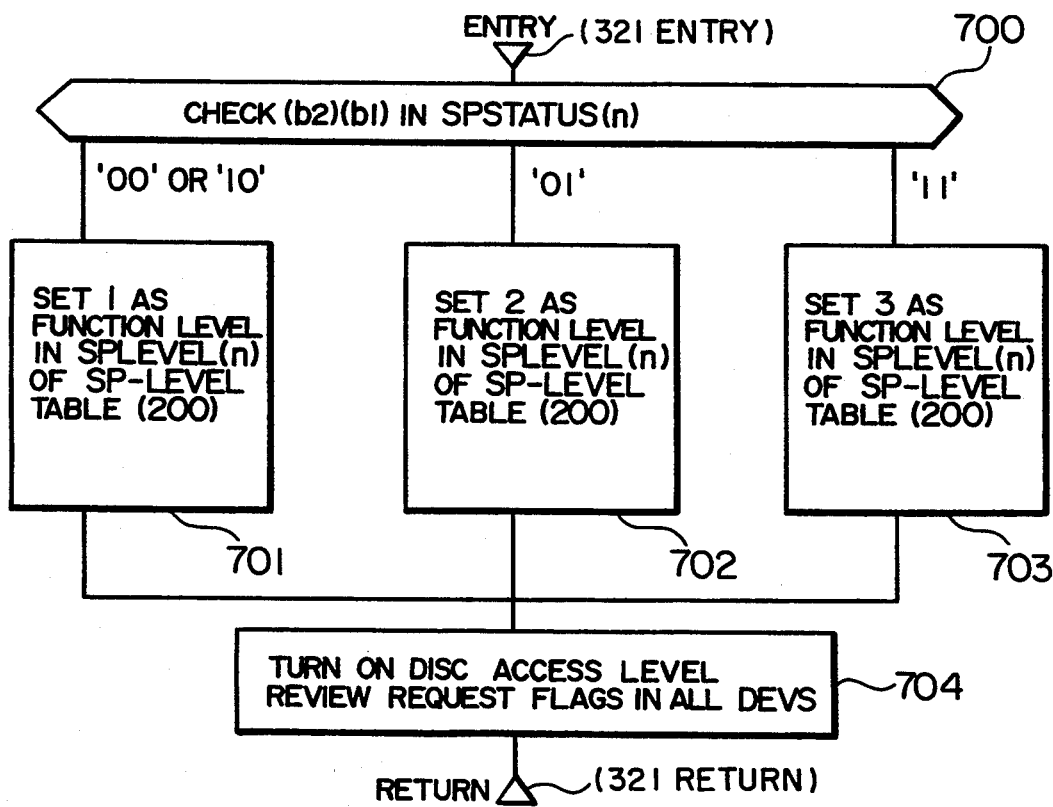
FIG. 8 is a flowchart for explaining storage path functional levels in the operation of a storage path.

In the flowchart of the storage path functional level changing procedure (FIG. 8), the values of the column (b1) and (b2) flags for the SPSTATUS (n) corresponding to the SP (n) in the SPSTATUS table 260 of FIG. 2 are checked, and the value of the SPLEVEL (n) corresponding to the SP (n) in the SPLEVEL table 200 in accordance with the bit pattern is set as shown in blocks 701–703 of FIG. 8.

In the cache/NVS closing procedure (block 322 in FIG. 3), if the number of storage paths, for which the value in the (b1) column of SPSTATUS table 260 is 0 and for which the (BN) is set to 1 in the SP-OPERATABLE table 220 of FIG. 2, is larger than the value of a threshold, 1 is set in the (C) flag of the cache/NVS-AVAILABLE table 250 and the cache is closed. If the number of storage paths for which the value of the (b2) column is 0 is equal to, or larger than, the value of the threshold, 1 is set in the (N) flag of the cache/NVS-AVAILABLE table 250 and the back-up memory (NVS) 106 is closed.

In the storage path closing procedure (block 324 in FIG. 3), the S (n) flags in which 1 is set are checked in the SPCLOSE table 270 of FIG. 2, 0 is set in the corresponding flag of the SP-available table 210, and 1 is set in the (FLAG) column for DEVs (1)–(4) of DEV table 230.

Figure 3:
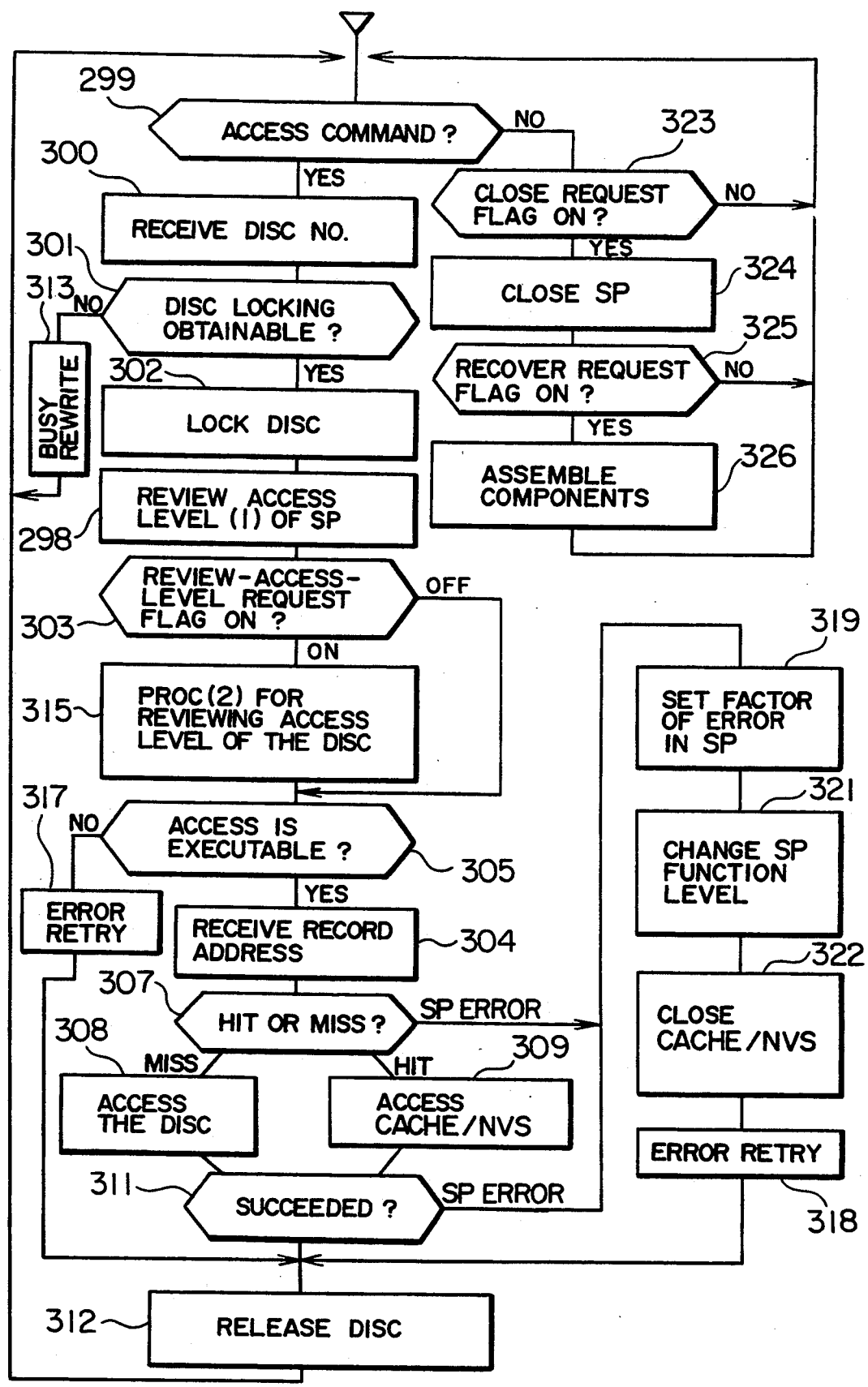
FIG. 3 is a flowchart showing the operation procedures of the respective storage paths in the disc control apparatus.

In the component recovering procedure block 326 in FIG. 3, flags for which 1 is set are checked in the RECOV table 280. If 1 is set for the (C) ((N)) flags of the cache/NVS AVAILABLE table 250, the values of SPLEVELs (1)–(4) of SPLEVEL table 200 are set to 3, and 1 is set in the (FLAG) column for DEVs (1)–(4) of the DEV table 230. If 1 is set in the S (n) flag, 1 is set in the (bn) flags of SP-AVAILABLE table 210 and SP-OPERATABLE table 220, and 1 is set in the (FLAG) column for DEVs (1)–(4) of the DEV table 230.

When any one of paths 141–152 for the discs 90–93 of FIG. 1 is closed (reconnected) for maintenance purposes or the like, 0(1) is set in the appropriate one of the flags (b1)–(b4) of the PAM values for DCB (n) in each disc (No.=n), and 1 is set in the (FLAG) column for DEV (n).

According to the particular embodiment described above, if an error occurs in any of the storage paths (1)–(4) and, if the cache, the back-up memory (NVS), and/or any path allocated to a disc: are closed, the cache can be used to the utmost using the existing storage path function and the disc can be accessed while preventing a data change condition from occurring when the storage path in the disc control apparatus accesses a disc connected to the apparatus to increase the availability of the disc control apparatus. Since the closing of a storage path for maintenance purposes and the closing of any of the paths allocated to each disc, etc., are performed without greatly influencing the operation of the disc subsystem, maintenance is easily performed while the disc subsystem is being operated.

Figure 9:
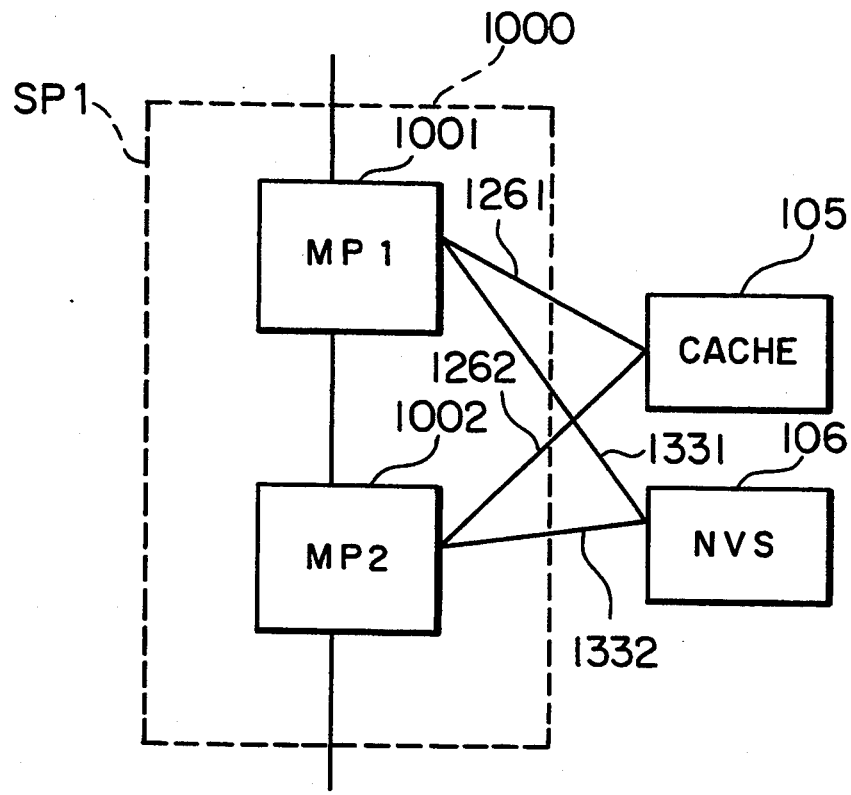
FIG. 9 illustrates an embodiment of one logical storage path, including two modules.
Figure 10:
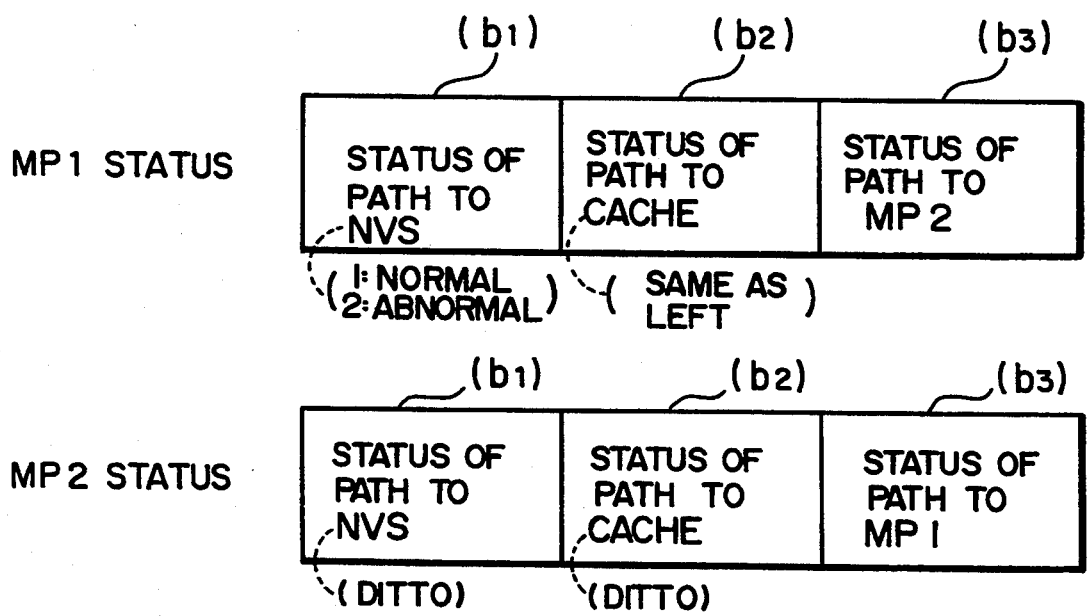
FIG. 10 illustrates the structure of a table which manages the status of two modules constituting a logical storage path.

While the particular embodiment calls for the use of a single processor as a storage path in the disc control apparatus, a single logical storage processor (SP1) 1000 which includes two separate processors (MP1) 1001 and (MP2) 1002 connected in series for mainly transferring data on the channel side and on the disc side, respectively, may be used as shown in FIG. 9. In this case, data on combinations of available and unavailable statuses of paths 1261, 1262, 1331, 1332 having MP1 and MP2 constituting the storage path are stored in a table shown in FIG. 10. If an error occurs in the paths for MP1 and MP2, the SPSTATUS of a logical storage path SP, including a processor MP in which an error has occurred in its path, or the value of SP-OPERATABLE in table 220, is set in a decision table Shown in FIG. 11 to thereby control access to a disc by the logical storage path in quite the same manner as the previous embodiment.

Figure 12:
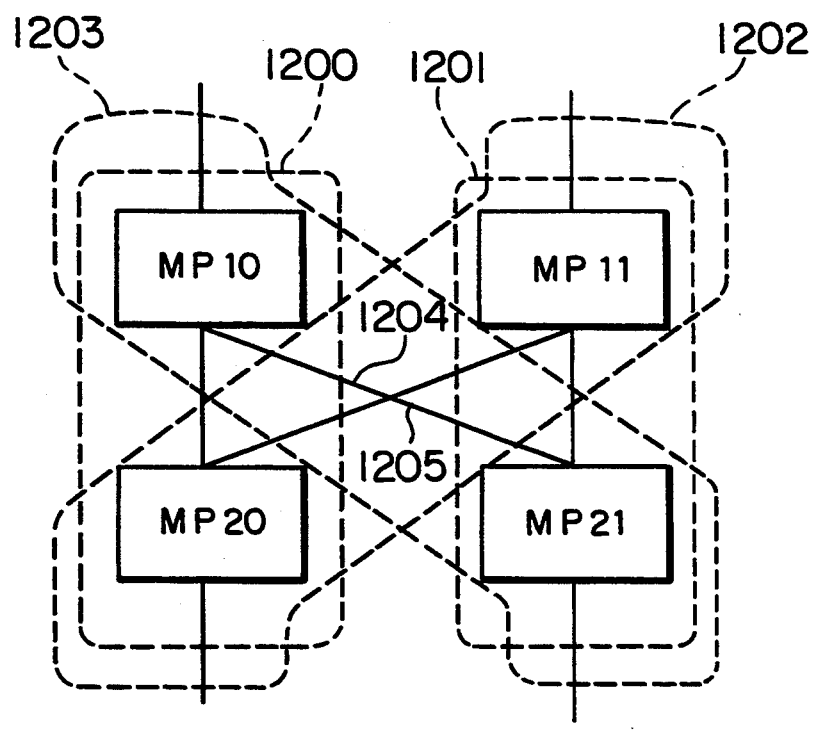
FIG. 12 illustrates the structure of a logical storage path in which two modules constituting a logical storage path and two modules consisting of another logical storage path have a cross path.

As shown in FIG. 12, if a structure is used in which cross paths 1204 and 1205 connect processors MP1 (MP10, MP11) and MP2 (MP20, MP21) constituting two logical storage paths 1200 and 1201, four storage paths including two new logical storage paths shown by blocks 1202 and 1203 are regarded as existing. The functional levels of the respective storage paths are obtained by combinations of the respective statuses of the processors constituting the respective storage paths, as mentioned above, to thereby set the functional levels of the respective storage paths in the control memory 104 in order to control the disc access by the logical storage paths in quite the same manner as the previous embodiment.

Figure 13:
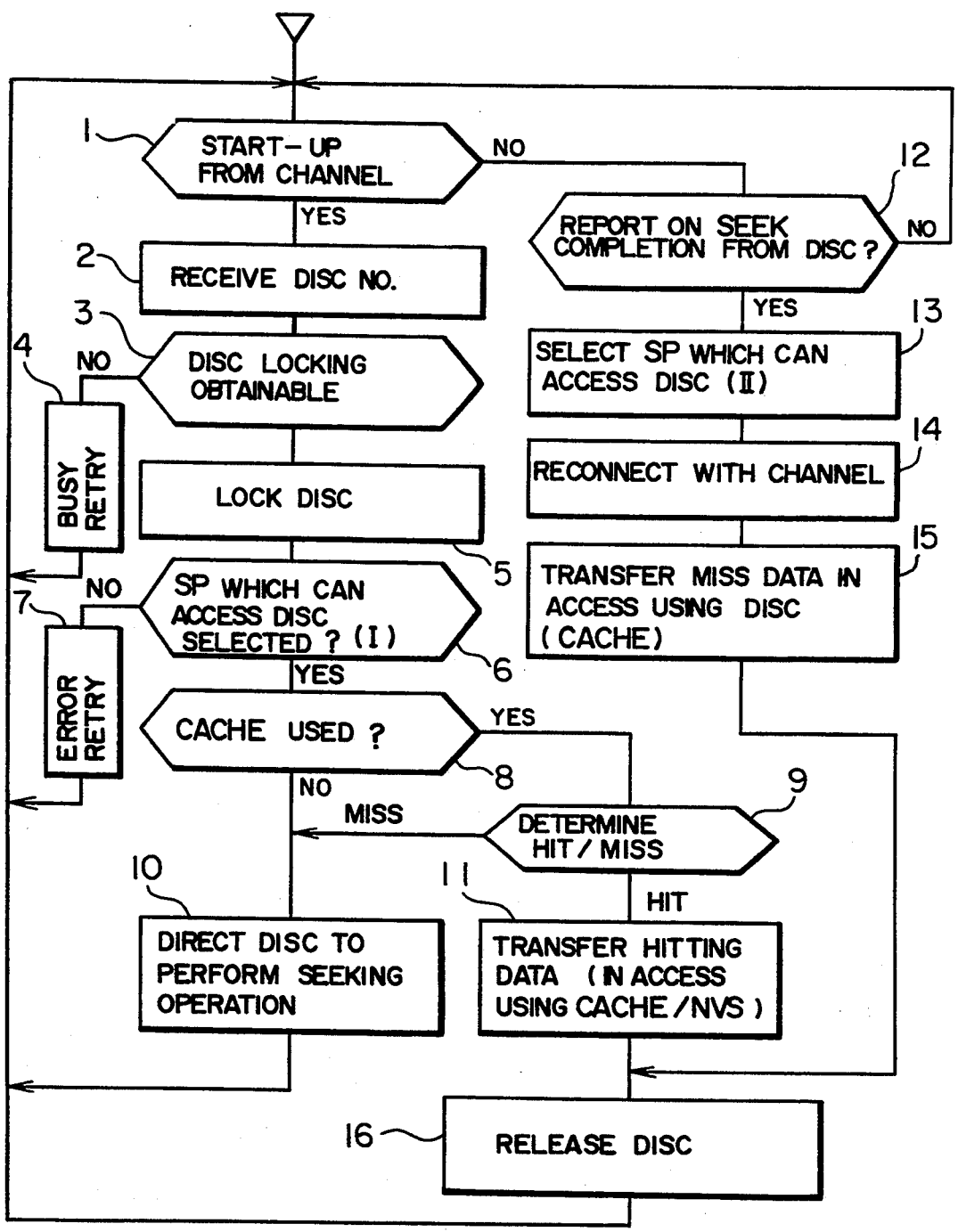
FIG. 13 is a flowchart showing the procedures executed by a disc control apparatus with a cache to which the present invention is applied.

An embodiment in which the aforementioned functional level reference is changed when a command is received from a channel and when a storage path SP is connected to a disc will be described in detail. FIG. 13 is a flowchart showing one embodiment of a process performed by a disc control apparatus to which the present invention is applied.

Figure 14:
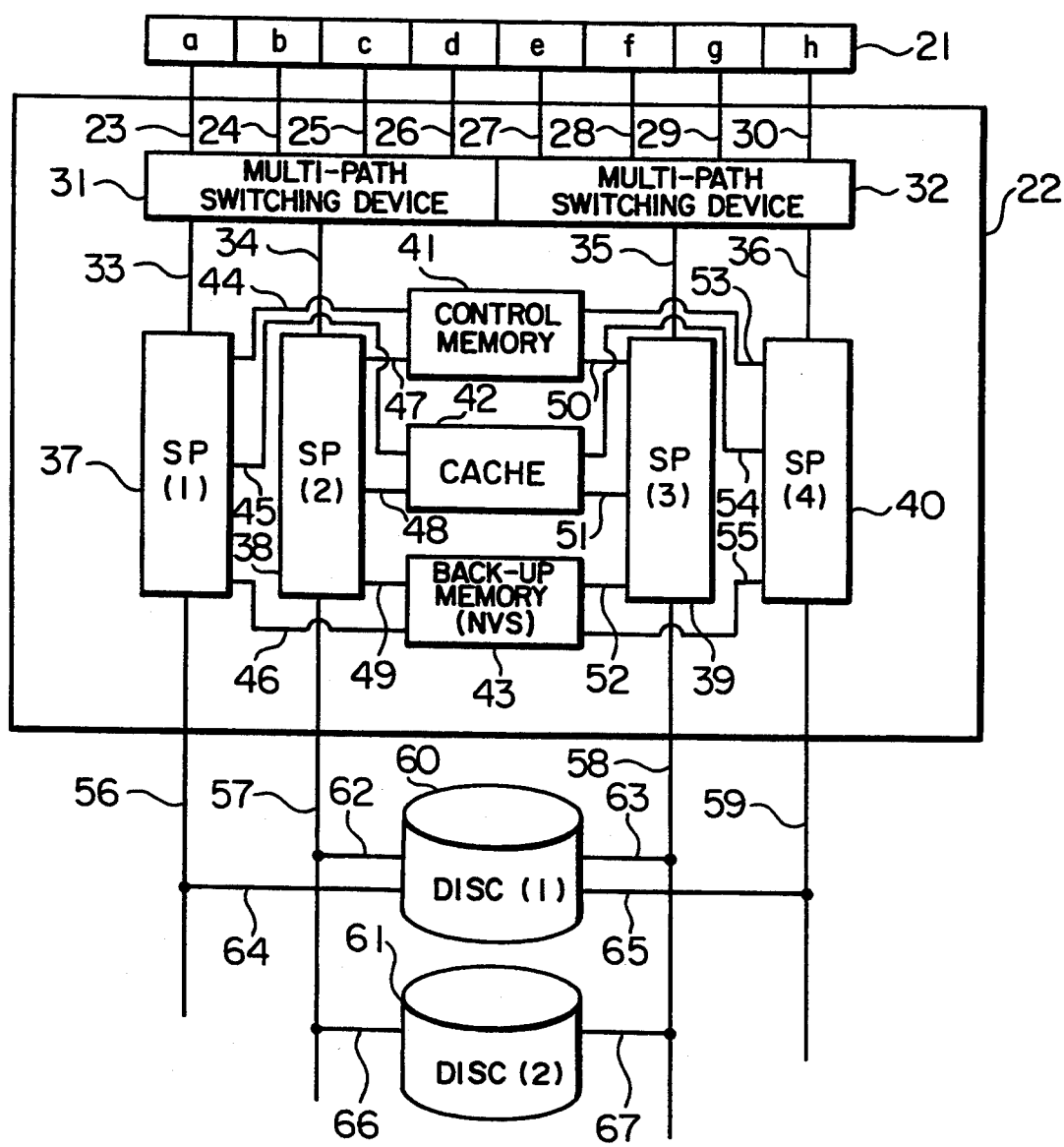
FIG. 14 is a block diagram of a disc subsystem, including a disc control apparatus with a cache, according to the present invention.

FIG. 14 illustrates the structure of a disc subsystem according to the present invention, including a disc control apparatus having a cache. In FIG. 14, the disc subsystem includes a channel control unit 21, a disc control apparatus 22, discs 60 and 61, connection lines 23–30 connecting the channel control unit and the disc control apparatus, and connection lines 56–59 connecting the disc control apparatus and the discs.

The channel control unit 21 has eight channels a–h through which eight access requests may be sent to discs 60 and 61. The disc control apparatus 22 has four storage paths (SPs) 37–40 which can process requests for data access from the respective channels in a parallel manner. The storage paths are each realized specifically by a special-purpose processor or a general-purpose microprocessor. The connection between the eight channels a–h and the four storage paths 37–40 is controlled in a dynamic switching manner by multipath switching devices 31, 32 such that requests for access from the channels are not collectively received by a particular storage path. The disc control apparatus 22 further includes a cache 42 and a back-up memory (NVS) 43. The cache 42 is a volatile memory which stores a copy of a part of data stored in the disc as required. The back-up memory (NVS) 43 is, for example, a nonvolatile memory which is used to backup data when updating the cache. There are three different methods of accessing a disc depending on what process for using the cache and/or the back-up memory (NVS) is employed:

(1) Access by use of the cache/NVS.

If a request for reading data previously stored in the cache (such request for access is referred to as a cache hitting access request) is received as a request for access from a channel (this is referred to as a read hit), the data stored beforehand in the cache is read instead of the data stored on the disc, to thereby improve the responsiveness of access to the data. If the cache hitting access request is a write request (referred to as a write hit), the data previously stored in the cache is updated by new data and the new data is written simultaneously into the back-up memory (NVS) to thereby terminate the processing for a request from the channel without updating the data stored on the disc. The new data updated in the cache alone is written collectively on the disc later during an available time by the disc control apparatus to thereby improve the responsiveness of access to the write request. If a request for access to data not previously stored in the cache (such request for access is referred to as a cache miss access request) in received from a channel, the disc is immediately accessed irrespective of whether the request is a read request/write request, data is transferred between the disc and channel and is simultaneously stored or loaded in the cache in preparation for the next access to the data.

(2) Access by use of the cache

The process for a request for a read operation is quite the same as that described in (1) above. In the case of a write hit, the data stored on the disc and the data in the cache are updated simultaneously. In the case of a write miss, the data stored on the disc is only updated and not loaded.

(3) Access without using the cache

Figure 15:
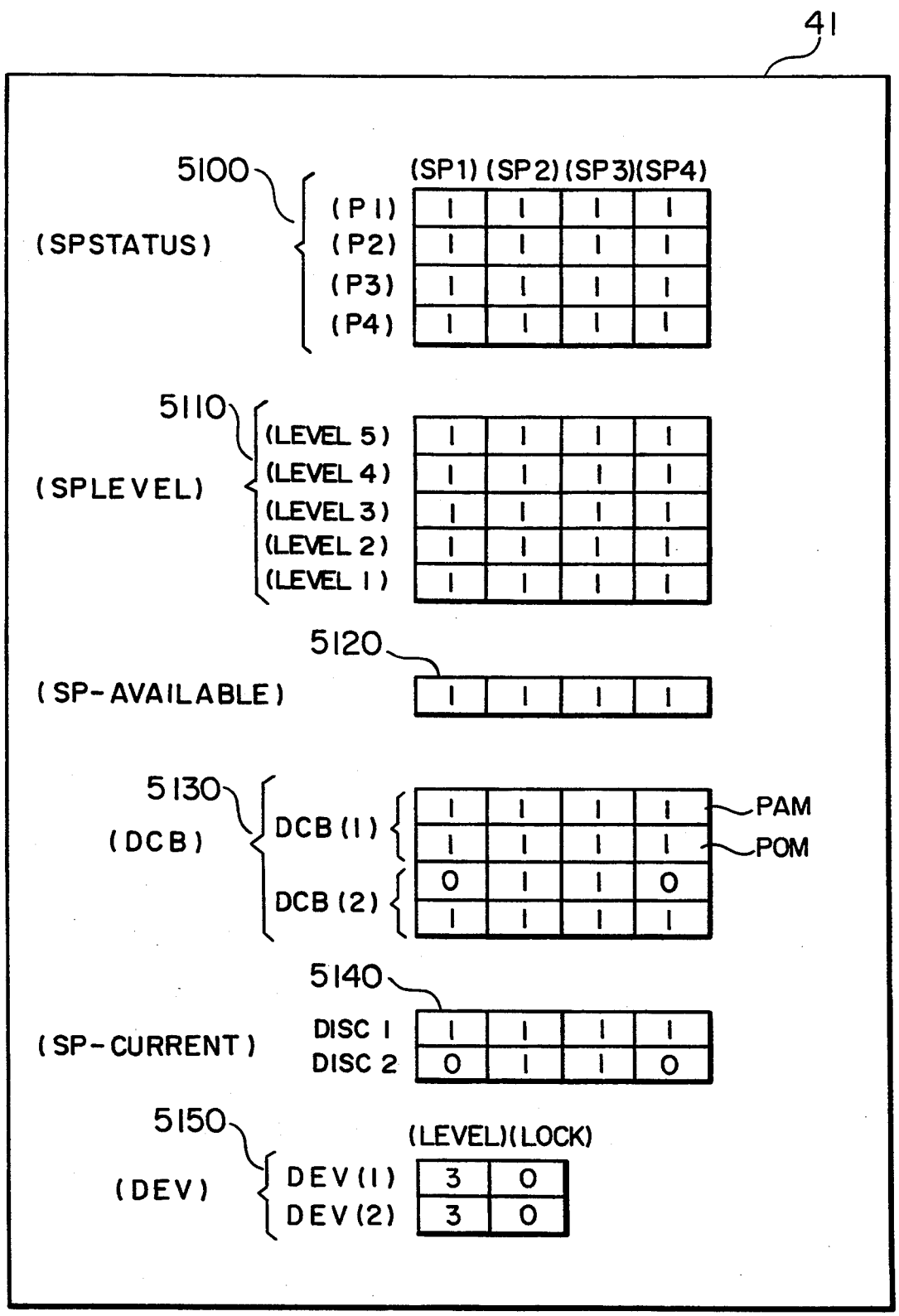
FIG. 15 illustrates data, in a table format, necessary for control using the present invention.

The cache is not used and the disc is directly accessed. The 41 is a memory which is referred to when the four storage paths (1)–(4) in the disc control apparatus 22 process requests for access and store data as shown in FIG. 15 in the form of a table.

First, the statuses of the storage paths are held in the SP-STATUS table 5100. As mentioned above, there are four data transfer paths as follows:

(P1) between the channels and the discs;
(P2) between the channels and the cache;
(P3) between the channels and the back-up memory (NVS); and
(P4) between the discs and the cache.

Numerical value "1" is set for each of the transfer paths (P1)–(P4) in the SP-STATUS table 5100 if the path is available in each storage path, while "0" is set if the transfer path is unavailable. In the example of FIG. 15, "1" is set because all the transfer paths are available to all of the storage paths.

SP-LEVEL table 5110 holds functional levels each indicative of the type of use by a storage path for the cache/NVS in accordance with the status of that storage path.

Five kinds of functional levels are set as follows:

(1) Functional level 5 at which direct access is possible between the respective channels and the disc via the respective storage paths, between the respective channels and the cache via the respective storage paths, and between the respective channels and the back-up memory (NVS) via the respective storage paths;

(2) Functional level 4 at which direct access is possible between the respective channels and the discs via the respective storage paths, between the respective channels and the cache via the respective storage paths, and between the respective discs and the cache via the respective storage paths;

(3) Functional level 3 at which direct access is possible between the respective channels and the discs via the respective storage paths, and between the respective channels and the cache via the respective storage paths;

(4) Functional level 2 at which direct access is possible between the respective channels and the respective discs via the respective storage paths, and between the respective discs and the cache via the respective storage paths; and (5) Functional level 1 at which direct access is possible between the respective channels and the respective discs via the respective storage paths.

Numerical value "1" is set for each storage path in the (level 5)–(level 1) in the SP-LEVEL table 5110, if that storage path has that functional level and "0" is set otherwise. This is determined by the status of the SP-STATUS table 5100. The method of determining this will be described later. FIG. 15 shows the setting of "1" on the presumption that all the storage paths have that functional level.

A flag indicative of whether each of storage paths is logically available in the disc control apparatus is set in SP-AVAILABLE table 5120 ("1" indicates that a storage path is available, while "0" indicates that a storage path is unavailable). The values in FIG. 15 show that all of the storage paths are logically available.

The respective structures of access paths present between the channels and the discs controlled by the disc control apparatus 22 are set in DCB 5130 in correspondence to those discs. More specifically, the respective structures of the access paths present between the discs 60 and 61 and the channels are set as the data for PAM and POM for DCB (1) and DCB (2).

A flag indicative of which of the storage paths (1)–(4) in the disc control apparatus each disc is logically connected to is set as the PAM value ("1" indicates the presence of a connection, while "0" indicates the absence of a connection).

In FIG. 14, disc 60 is connected with all of the storage paths (1)–(4) via paths 56–59, so that in FIG. 15, all the PAM values for DCB (1) are set to "1". Disc 61 is connected with only SP (2) and SP (3) via paths 57 and 58, so that "0" is set in (SP1) and in (SP4) for the PAM value for DCB (2), while "1" is set for (SP2) and (SP3).

A flag indicative of which of the storage paths (1)–(4) in the disc control apparatus can functionally access the appropriate disc is set for POM ("1" indicates that storage path can access, while "0" indicates that the storage path cannot). In FIG. 15, flags are set such that both DCB (1) and DCB (2) are accessible from all the storage paths.

The SP-CURRENT table 5140 holds data identifying each available storage path which has accessed a disc successfully. If each storage path is available when it accesses the disc, "1" is set; otherwise, "0" is set The methods of preparing and using this table will be described later.

An access level defining a method of accessing each disc is set for that disc as variables in the (LEVEL) column in DEV table 5150. The following four access levels are set:

(a) Access level 3 at which the disc is accessed using the cache/NVS;

(b) Access level 2 at which the disc is accessed using the cache;

(c) Access level 1 at which the disc is accessed without using the cache;

(d) Access level 0 at which access to the disc is inhibited.

In FIG. 15, both of the variable in column (LEVEL) of DEV table 5150 for DEV (1) and DEV (2) indicative of the access levels of the discs 60 and 61, respectively, are set to 3. These access levels are determined by the status of the SP-LEVEL indicated in table 5110. This method of determination will be described later. The contents of the variable in the (LOCK) column in DEV table 5150 will also be described later.

How the disc access control system in accordance with the present invention is realized using control data in the control memory 41 will be described with reference to the flowchart of FIG. 13. Specifically, this operation includes the implementation of a microprogram operating in a storage path.

Each storage path checks whether an initial start-up command from a channel has arrived at that storage path via the switching device 31 or 32 (block 1). If so, control passes to execution of an access command from the channel. First, the number of a disc to be accessed is received from the channel (block 2). The value of the variable (LOCK) for the DEV (n) corresponding to the disc (No.=n) in DEV table 5150 is checked (block 3). If the value of this variable is 1, it is determined that disc locking cannot be obtained, the receipt of the access command is cancelled, a BUSY RETRY is returned to the channel (block 4), and control returns to the processing for determining whether there is an arrival of an initial start-up command from a channel (block 1). If the value of the variable is 0, it is determined that disc locking is obtainable, the value of the variable is set to 1 (block 5) and a process I for selecting a storage path which can access a disc is performed (block 6). The details of the process I will be described later. As a result of performing the process I, if it is determined that the storage path which has received a start-up command from a channel can access a disc, the subsequent processes will be performed. If it is determined that the storage path which has received a start-up from a channel cannot access the disc and that there is another storage path which can access the disc, control is transferred to that other storage path, which then performs the subsequent processes. If it is determined that there are no available storage paths, the execution of the appropriate command is stopped, ERROR RETRY is returned to the channel (block 7) and control returns to the process for determining whether there is an arrival of an initial start-up command from a channel (block 1).

If a storage path which executes access uses the cache in its accessing process, a hit/miss determination is performed (block 9). This includes a determination as to whether a record to be accessed is stored in the cache. If the record to be accessed is not stored in the cache, or if the access process does not use the cache, it is necessary to access a disc directly. If the disc is accessed, first, the magnetic head must be positioned, so that a command for the SEEKing operation is issued to the disc (block 10). Since there is nothing to be done in the access process until the SEEKing operation is completed, after issue of a command for the SEEKing operation, the connection between the storage path and the channel is temporarily interrupted and control returns to the process for determining whether there is an arrival of an initial start-up command from a channel (block 1). If the record to be accessed is stored in the cache, cache hit data is transferred (block 11). Namely, if the access involves a request for a read operation, data is transferred from the cache to the channel. If the access using the cache/NVS is a write hit, data is transferred from the channel to the cache/NVS. If the access using the cache is a write hit, which means that the cache contains data to be written, it is necessary to access a disc, so that the same processing as that employed in the miss operation is performed.

If it is determined that no initial start-up command has arrived from a channel, it is determined whether there is a report on the completion of the SEEKing operation from a disc (block 12).

If it is determined that there is no report, control returns to the processing for detecting whether there has been an arrival of an initial start command from a channel (block 1). If it is determined that there is a report, processing II for selecting an available storage path is performed (block 13). The details of the processing II will be described later. As a result of performing the processing II, a storage path which performs subsequent processes is determined. This storage path first reconnects with a channel (block 14), and then transfers miss data, which is data which the cache does not contain (block 15), the details of which will be described below. In the case of a read miss, which means that the cache does not contain data to be read, data is transferred from the disc to the channel, and the contents of records to be accessed are transferred from the disc to the cache. In the case of a write miss, which means that the cache/NVS does not contain data to be written, in the access using the cache/NVS, data is transferred from the channel to the cache/disc, and the contents of the records to be accessed are transferred from the disc to the cache. In the case of a write hit in the access using the cache, data is transferred from the channel to the cache/disc. In the case of a write miss, data is transferred from the channel to the disc. In the access using no cache, data is transferred only between the channel and the disc.

When the data transfer is completed, the value of the variable in the (LOCK) column for the DEV (n) corresponding to the disc (No.=n) in DEV table 5150 is set to 0 (block 16) and control returns to the processing for detecting the arrival of an initial start-up command from a channel (block 1).

FIG. 16 shows a list of paths used in the data transmission (the mark  indicates that there is a transfer path corresponding to the access process).

The contents of the processing I and II for selecting the accessible storage path will now be described. In both the processing I and processing II, the SP-CURRENT table 5140 of FIG. 15 is updated, and it is determined that a storage path in which "1" is set can execute the access. The results of ANDing the corresponding bits in the SP-AVAILABLE table 5120, the PAM and POM bits for the disc in the DEB table 5130 and any appropriate one level in the SP-LEVEL table 5110 are set in the SP-CURRENT table 5140. Which one of the levels in the SP-LEVEL table 5110 is used is determined on the basis of the access level of the disc and on whether the processing for selecting a storage path which can execute the access is the processing I or II. The details of this determination will be described below. As mentioned above, in the case of a miss, the storage path is temporarily interrupted from the channel and a new storage path is selected, so that a storage path which can execute the access is required to be selected in the case of a hit in the selecting processing I. Therefore, in the access using the cache/NVS, the level 5 of the SP-LEVEL table 5110 is used. In the access using the cache, the level 3 is used. In the processing II for selecting a storage path which can execute the access, a hit or miss is already discriminated, so that the SP-LEVEL can be selected correspondingly. Namely, for an access using the cache/NVS, there is only the case of a miss, so that the level 4 is used. If the access using the cache is a write hit, level 3 is used, and if it is a miss, level 2 is used. For the access using no cache, level 1 is used.

The process performed when it is determined that there are no storage paths which can execute access in the processing II for selecting the storage path which can execute access will now be described. Such absence of storage paths derives from the fact that there are no storage paths which can directly access the disc and have available paths between the disc and cache. The loading using the paths between the discs and the cache is performed in preparation for the arrival of a new possible access to the same record. This processing causes no inconvenience even if it cannot be executed. Therefore, if it is determined that there are no storage paths which can execute access, a storage path which can execute access is selected as such, except for loading. Specifically, in the case of access using the cache/NVS, level 3 is newly used as the SP-LEVEL to re-form the SP-CURRENT value. In a access using the cache, level 1 is newly used.

Figure 17:
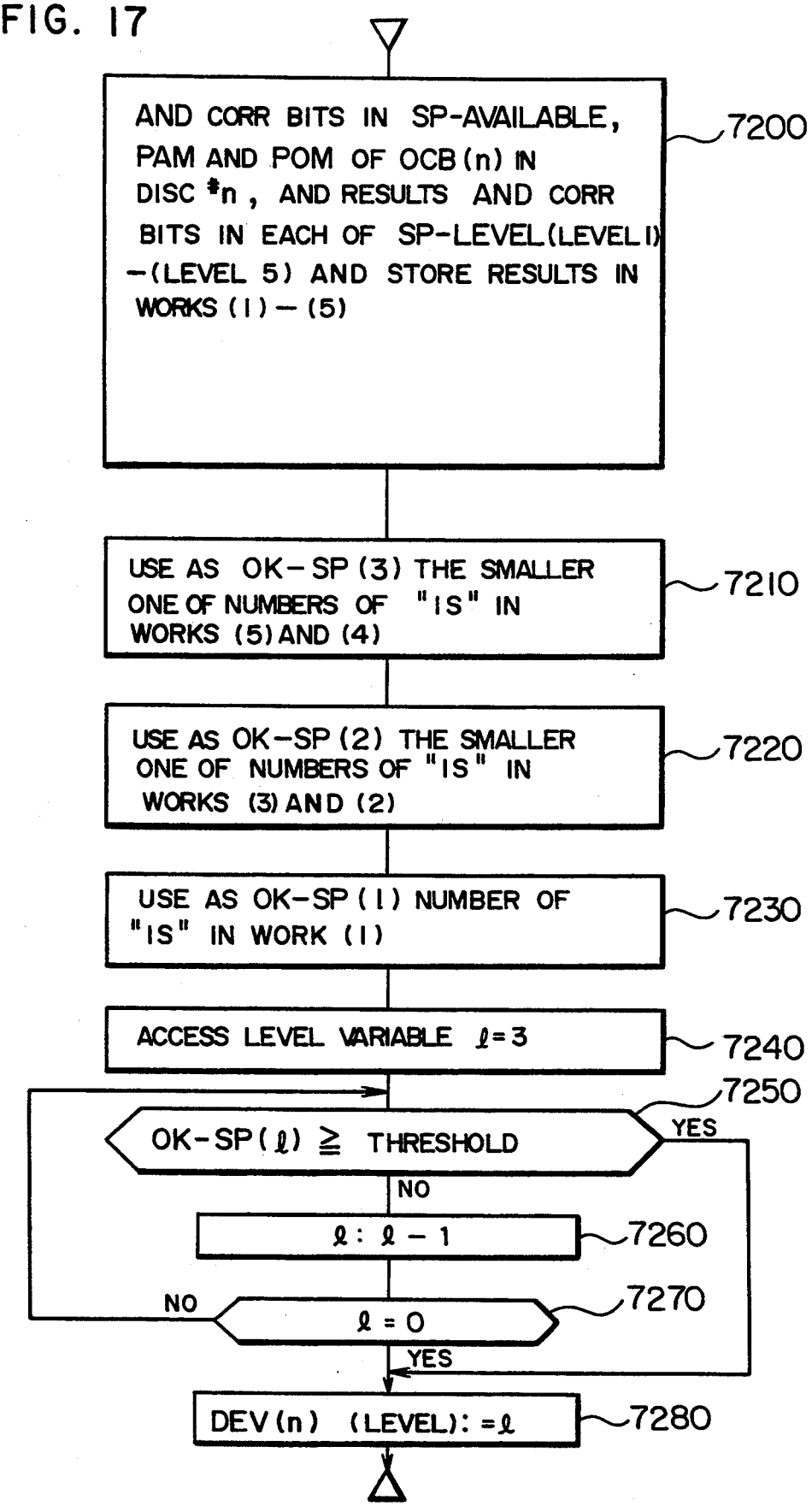
FIG. 17 is a flowchart showing a procedure for determining an access level.

The processing for determining the access level will now be described with reference to FIG. 17. This processing is performed when an error occurs in a component of the disc control apparatus, or when a component is temporarily disconnected or otherwise assembled for maintenance purposes to cause a change in the data stored in the control memory (FIG. 15). First, the corresponding bits in the SP-AVAILABLE table 5120 and the PAM and POM values for a DCB (n) corresponding to the disc (No.=n) are ANDed, and the respective results and corresponding bits in each of the (level 1)–(level 5) rows in the SP-LEVEL table 5110 are ANDed and the resulting data is stored in WORK (1)–WORK (5) (block 7200). As described in the,, processing for selecting a storage path which can execute the requested access, WORK (i) represents a storage path which can execute access in each of the following cases:

WORK (5): in the access using the cache/NVS when a hit occurs;

WORK (4): in the access using the cache/NVS when a miss occurs;

WORK (3): in the access using the cache when a hit occurs;

WORK (2): in the access using the cache when a miss occurs; and

WORK (1): in the access using no cache.

The smaller one of the,, numbers of bits in WORKs (5) and (4) where "1s" are set is used as OK-SP (3) (block 7210). This represents the number of storage paths which can execute access logically at access level 3. Similarly, the smaller one of the numbers of bits in WORKs (3) and (2) where "1s" are set is used as OK-SP (2) (block 7220), and the number of bits in WORK (1) where "1s" are set is used as OK-SP (1) (block 7230). The highest one of the access levels, which satisfy the condition in which there are storage paths which can execute access and which are larger in number than the threshold, is used as the access level of the disc (blocks 7240, 7250, 7260, 7270). Finally, the value of the access level determined is set in the (LEVEL) column for the DEV (n) of the disc (block 7280).

The process for changing the functional level of the storage path will now be described with reference to FIG. 18. This process is performed when there occurs an error in a component of the disc control apparatus or if a component is temporarily disconnected or otherwise assembled for maintenance purposes to thereby cause a change in the SP-STATUS. First, the values of the (p1)–(p4) flags of a SP-STATUS (k) corresponding to the SP (k) in SP-STATUS table 5100 are checked and the value of the SP-LEVEL (k) corresponding to the appropriate SP (k) in the SP-LEVEL table 5110 set in accordance with a bit pattern of the flag values. FIG. 18 shows the relationship between the SP-LEVEL and the bit pattern of the SP-STATUS (when all the bits of the SP-STATUS with the mark O are "1" in level, "1" is set in that level).

If any one of the paths (62–67 in FIG. 14) for the respective discs (60, 61 in FIG. 2) is closed (re-connected) for maintenance purposes or the like, "0" ("1") is set in the corresponding flag in the PAM row of the DCB (n) of that disc (No.=n).

While the present invention has been described as using four or two discs, eight channels and four storage paths, it may be applicable to a disc control method and apparatus using a different number of discs, a different number of channels, and a different number of storage paths.

According to the particular embodiment, if an error occurs in any one of the paths for transfer of data in the disc control apparatus or if any one of the paths for the respective discs is closed, most of the storage paths are available in the disc control apparatus to access the discs connected to the disc control apparatus to thereby improve the usability of the disc control apparatus. Since closing a storage path for maintenance purposes and closing of any one of paths for the respective discs can be performed without greatly influencing the operation of the disc subsystem, maintenance is facilitated, while the disc subsystem is operating.

According to the present invention, if an error occurs in the access of the cache/NVS in any one of the storage paths present in the disc control apparatus or if an error or closing occurs in any of the paths to the respective discs, the cache is utilized to its maximum degree within the scope of the functions existing in the storage paths in the disc control apparatus, to thereby improve the usability of the disc control apparatus. Since closing of a storage path for maintenance purposes and closing of any one of the paths to the respective discs can be performed without greatly influencing the operation of the disc subsystem, maintenance is facilitated, while the disc subsystem is operating.

We claim:

1. In a disk control apparatus for controlling access from a plurality of channels for supplying access requests, to a plurality of disks for reading and writing data, wherein the disk control apparatus includes a cache for storing a copy of the data stored on said disks, a plurality of storage paths each being responsive to access requests received from said channels for reading and writing data stored in said cache and on said disks and a control memory for storing access control information used by said storage paths to control access by said storage paths to said cache and to said disks in response to an access request received from one of said channels, a disk access control method comprising the steps of:

(a) accessing said control memory to obtain access control information indicating functional level of a storage path which receives an access request from a channel for accessing a designated disk and to obtain access control information indicating a functional level of said designated disk;

(b) determining whether said storage path which receives said access request is capable of executing the requested access and whether this type of access is permitted by comparing said functional level of said storage path with said functional level of said designated disk; and (c) controlling said storage path to access said cache and/or said designated disk to read and/or write data in accordance with the ability of the storage path to execute the requested access and the functional level of said designated disk;

wherein the functional levels of said storage path include:

(i) a functional level at which a disk can be read/written directly via a storage path and at which the cache can be read/written via a storage path, (ii) a functional level at which a disk can be read/written directly via a storage path and at which the cache can be only read via a storage path, (iii) a functional level at which a disk can be directly read/written via a storage path and at which the cache cannot be accessed via a storage path, and (iv) a functional level at which a data access to a disk cannot be performed by a storage path because of a disk failure, wherein said functional level (i) is the highest level followed by said functional levels (ii), (iii) and (iv).

2. A disk access control method according to claim 33, wherein said step (b) comprises:

(b1) determining from said access control information a functional level of said storage path indicative of a type of cache use available to said storage path, said type of cache use is one of three types including (i) a first type representing that the cache is usable for read/write, (ii) a second type representing that the cache is usable only for read, and (iii) a third type representing that the cache is not usable, the functional level of the first type being the highest followed by the second type (ii) and the third type (iii);

(b2) determining from said access control information an access level for said designated disk indicative of the lowest functional level required for a storage path to access said designated disk; and (b3) determining that said storage path, which receives said access request, is capable of executing said access request when the functional level of said storage path is at least equal to the access level of said designated disk.

3. A disk access control method according to claim 2, wherein said step (b) further includes:

(b4) lowering the access level of said designated disk when no storage path has a functional level which is at least equal to the access level of said designated disk as stored in said control memory.

4. A disk access control method according to claim 3, wherein the access levels of said disks include:

(1) an access level at which a disk can be accessed only from the storage paths having the functional level (i);

(2) an access level at which a disk can be accessed only from the storage paths having the functional levels (i) or (ii);

(3) an access level at which a disk can be accessed from the storage paths having the functional levels (i), (ii) or (iii); and (4) access level at which disk access is inhibited regardless of the functional level of the storage path.

5. A disk access control method according to claim 4, further comprising the steps of:

(d) setting the access level of all disks to level (1) when the cache is disconnected; and (e) setting the access level of all disks to level (3) when the cache is reconnected.

6. A disk access control method according to claim 3, further comprising the step of:

(d) setting the functional level of a storage path which has recovered from a fault to one of the functional levels (i), (ii) and (iii) in accordance with the access level of the storage path after repair of the storage path.

7. A disk access control method according to claim 3, further comprising the steps of:

(d) interrupting a connection between a disk and at least one storage path for performing an operation of closing at least one storage path for maintenance of the at least one storage path by temporarily setting the functional level of the storage path to level (iv); and (e) after the maintenance of the at least one storage path operation, opening the at least one storage path by setting the functional level of the at least one storage path to one of the functional levels (i), (ii), and (iii).

8. A disk access control method according to claim 3, wherein said disk control apparatus further includes a back-up memory, and wherein said method further comprises the steps of:

(d) storing data in said back-up memory at the time said data is written in said cache in response to an access request designating a particular disk; and (e) transferring data stored in said back-up memory from the back-up memory to the disk asynchronously withstoring data in said back-up memory.

9. A disk access control method according to claim 8, further including the steps of:

(f) setting the access level of all disks to level (1) when said back-up memory is disconnected; and (g) setting the access level of all disks to level (3) when said back-up memory is reconnected.

10. A disk access control method according to claim 1, further including the steps of:

(d) detecting an error during a data access involving a particular storage path; and (e) regenerating a current functional level of the particular storage path as indicated by the access control information stored in said control memory to designate a new functional level which is more restrictive concerning accesses to said cache than said previous functional level.

11. A disk access control method according to claim 10, wherein said step (e) comprises:
(e1) setting a new functional level for said particular storage path based on the new cache functional level which has been reduced to the occurrence of each path fault.

12. A disk access control method according to claim 10, wherein said step (e) comprises:
(e2) closing said particular storage path; and
(e3) selecting another storage path for accessing said designated disk by evaluating the functional levels of storage paths, other than said particular storage path, which are accessible to said designated disk and are unclosed.

13. A disk access control method according to claim 1, further including the steps of:
(d) determining from said access information in said control memory the functional level for all storage paths from which said designated disk is accessible;
(e) selecting the highest functional level of the functional levels determined in step (d) for storage paths having a functional level higher than the access level of the designated disk; and
(f) setting the access level of the access control information for the designated disk as stored in said control memory to be equal to the functional level selected in step (e).

14. A disk access control method according to claim 1, further including the steps:
(d) storing, as part of said access control information in said control memory, a request flag indicating a change of an access level of a disk when the functional level of a storage path connected to the disk has been changed due to occurrences of faults in a storage path and/or cache due to maintenance for recovery of the storage path and/or cache; and
(e) changing the access level of said disk based on the functional level of information of storage paths connected to said disk.

15. A disk access control method according to claim 1, wherein said disk control apparatus further includes a back-up memory and wherein said method further comprises the steps of:
(d) storing data in said back-up memory at the time said data is written in said cache in response to an access request designating a particular disk; and
(e) transferring data stored in said back-up memory from the back-up memory to the disk asynchronously with storing data in back-up memory.

16. A disk access control method according to claim 15, wherein the functional levels of said storage paths includes:
(i) a level at which direct access is possible via a storage path between a channel and a disk, at which access is possible via a storage path between a channel and the cache, and at which access is possible via a storage path between a channel and said backup memory;
(ii) a level at which direct access is possible via a storage path between a channel and a disk, at which access is possible via a storage path between a channel and the cache and at which access is possible via a storage path between a disk and the cache;
(iii) a level at which direct access is possible via a storage path between a channel and a disk and at which access is possible via a storage path between a channel and the cache;
(iv) a level at which direct access is possible via a storage path between a channel and a disk and at which access is possible via a storage path between a disk and the cache; and
(v) a level at which direct access is possible via a storage path between a channel and a disk.

17. A disk access control method according to claim 16, further including the steps of:
(f) regenerating to one of the functional levels (i), (ii), (iii), (iv) and (v) the functional level of a storage path which experiences a fault therein or closing the storage path in accordance with the degree of the fault, wherein the degree of fault is classified into three types including
degree-1 wherein the cache is accessible and the back-up memory is not accessible,
degree-2 wherein the cache is not accessible, and
degree-3 wherein the disk is not accessible; and
selecting a storage path based on a value of functional levels of unclosed storage paths connected to the disks controlled by the disk control apparatus.

18. A disk access control method according to claim 16, further including the steps of:
(f) setting the functional level of a storage path which has recovered from a fault to one of the functional levels (v), (iv), (iii), (ii) and (i) in accordance with the degree of recovery of the storage path, wherein the degree of recovery is classified into three types including
degree-1 wherein the disk is accessible, the cache is not accessible and the back-up memory is not accessible,
degree-2 wherein the disk is accessible, the cache is accessible and the back-up memory is accessible,
degree-3 wherein the disk is accessible, the cache is accessible and the back-up memory is accessible; and
(g) executing access in accordance with a combination of functional levels of at least one storage path connected to the disks controlled by the disk control apparatus.

19. A disk access control method according to claim 15, further including the steps of: (f) determining if there is any storage path capable of executing access to a disk at an access level if there is any storage path capable of receiving an initial start-up signal from a channel and one storage path capable of receiving a report on the completion of a SEEKing operation from a disk at the access level and determining, whether those storage paths are the same or not;
(g) counting the number of storage paths capable of executing access at each access level; and
(h) seeking as the access level of the disk the highest functional level of the storage paths, the total number of storage paths which exceeds a threshold value.

20. A disk access control method according to claim 1, further comprising the steps of:
(d) increasing the number of storage paths by constituting each storage path with two or more processors, and connecting the processors using cross paths between said processors.

21. In a disk control apparatus for controlling access from a plurality of channels for supplying access requests, to a plurality of disks for reading and writing data, wherein the disk control apparatus includes a cache for storing a copy of the data stored on said disks, a plurality of storage paths each being responsive to access requests received from said channels for reading and writing data stored in said cache and on said disks and a control memory for storing access control information used by said storage paths to control access by said storage paths to said cache and to said disks in response to an access request received from one of said channels, a disk access control method comprising the steps of:

(a) storing in said control memory a highest ranking value of functional levels of data transfer paths of each storage path, said highest ranking value being stored in correspondence to said each storage path, wherein each of said plurality of storage paths includes therein a plurality of arbitrarily selectable and usable data transfer paths so that said each storage path performs data transfer between a channel and a disk, and/or said cache, and a ranking value of each data transfer path in each storage path is defined as a functional level of said each data transfer path, said ranking value being assigned to each data transfer path in correspondence to an inclusion relation of data transfer function executed by said each storage path, and storing in said control memory an access level for respective disk, said access level being stored in correspondence to each disk, said access level representing a functional level so that all said storage paths accessing a designated disk or said cache storing data of said designated disk are restricted to use a data transfer path in each storage path having a same functional level indicated by an access level of said designated disk in order to transfer the data of said designated disk or the data of said designated disk stored in said cache;

(b) comparing, in response to a storage path which receives an access request from a channel for accessing a designated disk or said cache storing data of said designated disk, the ranking value of said storage path stored in said control memory with a value of the access level of said designated disk stored in said control memory, and judging whether said functional level is equal to or higher than said access level, to thereby determine that said storage path is capable of executing the requested access to said designated disk; and (c) selecting, in response to said storage path which is determined to be capable of executing the requested access to said designated disk, selecting a data transfer path corresponding to a functional level which is the same as the access level of said designated disk, and transferring the data of said designated disk or data of said cache storing the data of said designated disk by using said selected data transfer path wherein the functional levels of said storage path include:

(i) a functional level at which a disk can be read/written directly vial a storage path and at which the cache can be read/written via a storage path, (ii) a functional level at which a disk can be read/written directly via a storage path and at which the cache can be only read via a storage path, (iii) a functional level at which a disk can be directly read/written via a storage path and at which the cache cannot be accessed via a storage path, and (iv) a functional level at which a data access to a disk cannot be performed by a storage path because of a disk failure, wherein said functional level (i) is the highest level followed by said functional levels (ii), (iii) and (iv).

* * * * *